US008009745B2

(12) United States Patent
Glazko et al.

(10) Patent No.: US 8,009,745 B2
(45) Date of Patent: Aug. 30, 2011

(54) TIME TRACKING FOR A RECEIVER WITH GUARD INTERVAL CORRELATION

(75) Inventors: Serguei A. Glazko, San Diego, CA (US); Kuei-Chiang Lai, Hsinchu (TW); Shimman Patel, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 979 days.

(21) Appl. No.: 11/386,865

(22) Filed: Mar. 22, 2006

(65) Prior Publication Data
US 2007/0110174 A1    May 17, 2007

Related U.S. Application Data

(60) Provisional application No. 60/737,087, filed on Nov. 15, 2005.

(51) Int. Cl.
*H04K 1/10* (2006.01)
(52) U.S. Cl. ........................................... 375/260
(58) Field of Classification Search .................. 375/260, 375/343; 455/506
See application file for complete search history.

(56) References Cited

U.S. PATENT DOCUMENTS

| 6,459,744 | B1 | 10/2002 | Helard et al. | |
|---|---|---|---|---|
| 6,559,894 | B2* | 5/2003 | Omura et al. | 348/614 |
| 6,631,157 | B1* | 10/2003 | Davidovici et al. | 375/148 |
| 7,317,760 | B2* | 1/2008 | Jeong et al. | 375/260 |
| 7,386,055 | B2* | 6/2008 | Morita et al. | 375/260 |
| 7,675,960 | B2 | 3/2010 | Brethour et al. | |
| 2003/0220120 | A1* | 11/2003 | Hagin-Metzer et al. | 455/504 |
| 2004/0179633 | A1* | 9/2004 | Shinoda et al. | 375/343 |
| 2005/0129092 | A1 | 6/2005 | Santhoff et al. | |
| 2005/0135491 | A1* | 6/2005 | Santhoff et al. | 375/259 |
| 2005/0255819 | A1* | 11/2005 | Kawamoto et al. | 455/277.1 |
| 2005/0265488 | A1* | 12/2005 | Jung | 375/340 |

(Continued)

FOREIGN PATENT DOCUMENTS

EP    1416693    5/2004

(Continued)

OTHER PUBLICATIONS

International Search Report—PCT/US06/060950, International Search Authority—European Patent Office, Apr. 4, 2007.

(Continued)

*Primary Examiner* — David C. Payne
*Assistant Examiner* — Leon-Viet Q Nguyen
(74) *Attorney, Agent, or Firm* — Timothy F. Loomis; Sayed H. Beladi

(57) ABSTRACT

Techniques for performing time tracking at a receiver are described. A first arriving path (FAP) and a last arriving path (LAP) are detected based on a channel impulse response estimate for a communication channel. The detected FAP and LAP may be correct or swapped. To resolve ambiguity in the detected FAP and LAP, a first hypothesis corresponding to the FAP and LAP being correctly detected and a second hypothesis corresponding to the FAP and LAP being incorrectly detected are evaluated. For each hypothesis, hypothesized FAP and LAP are determined based on the detected FAP and LAP, a correlation window is determined based on the hypothesized FAP and LAP, and correlation is performed using the correlation window. The correct hypothesis is determined based on correlation results for the two hypotheses. The receiver timing is updated based on the hypothesized FAP and LAP for the correct hypothesis and used for demodulation.

38 Claims, 12 Drawing Sheets

U.S. PATENT DOCUMENTS

| | | | |
|---|---|---|---|
| 2008/0107195 A1* | 5/2008 | Kishigami et al. | 375/260 |
| 2009/0022207 A1* | 1/2009 | Brethour et al. | 375/130 |

FOREIGN PATENT DOCUMENTS

| | | |
|---|---|---|
| EP | 148150 | 11/2004 |
| EP | 1478150 | 11/2004 |
| EP | 1482699 | 12/2004 |
| GB | 2390517 | 1/2004 |
| JP | 2001251272 | 9/2001 |
| JP | 2004179816 | 6/2004 |
| JP | 2008533859 | 8/2008 |
| JP | 2008533860 T | 8/2008 |
| JP | 2008533861 | 8/2008 |
| RU | 2107992 | 3/1998 |
| RU | 2150176 | 5/2000 |
| TW | 589833 | 6/2004 |
| WO | WO9616524 A2 | 5/1996 |
| WO | 029383 | 1/2002 |
| WO | WO03019808 | 3/2003 |
| WO | 204012452 | 2/2004 |
| WO | WO20040012452 | 2/2004 |
| WO | 04034603 | 4/2004 |

OTHER PUBLICATIONS

Written Opinion, PCT/US06/060950, International Search Authority—European Patent Office, Apr. 2, 2007.

International Preliminary Report on Patentability, PCT/US06/060950, International Bureau of WIPO—Geneva, Switzerland, May 20, 2008.

Taiwanese Search Report-095142308, TIPO-Dec. 25, 2009.

Translation of Office Action in Japanese application 2008-541472 corresponding to U.S. Appl. No. 11/386,865, citing JP2004179818 JP2001251272, JP2008533861, JP2008533860 and JP2008533859 dated Jan. 25, 2011.

* cited by examiner

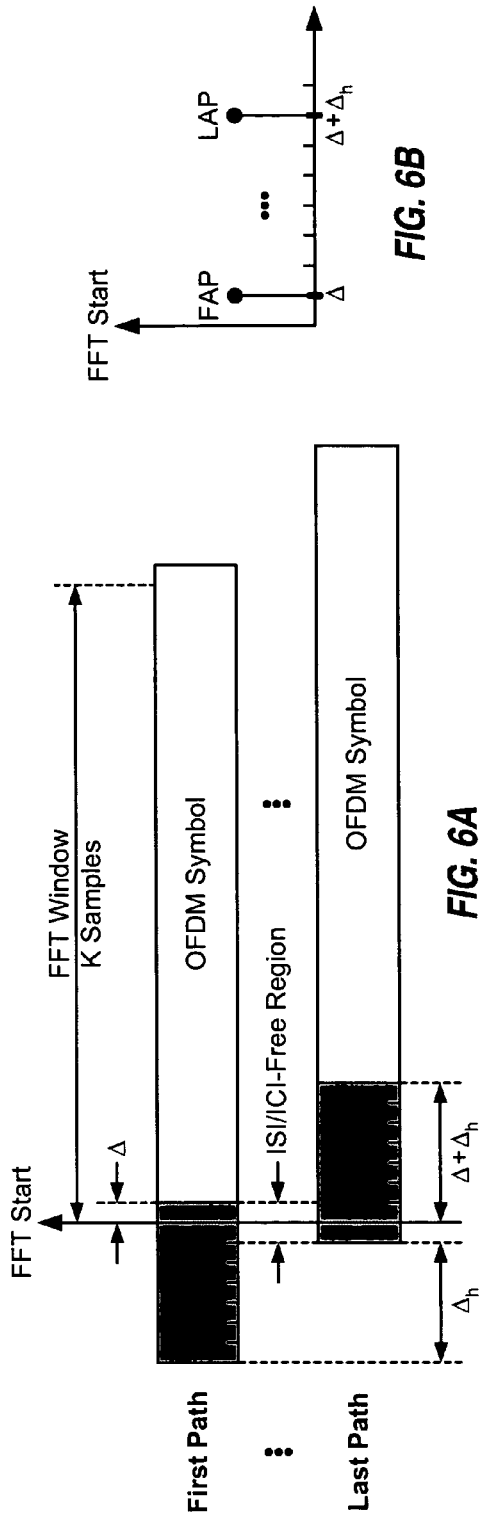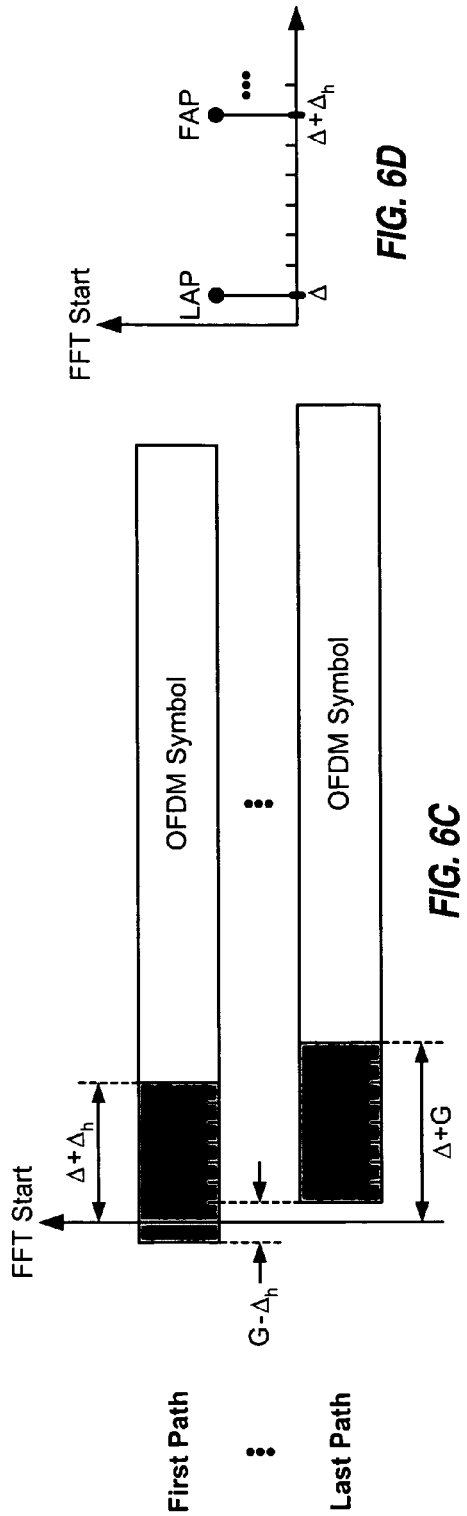

TIME TRACKING FOR A RECEIVER WITH GUARD INTERVAL CORRELATION

The present application claims priority to provisional U.S. Application Ser. No. 60/737,087, entitled "IMPROVED TIME TRACKING ALGORITHM VIA GUARD INTERVAL CORRELATION FOR OFDM SIGNALS," filed Nov. 15, 2005, assigned to the assignee hereof and incorporated herein by reference.

BACKGROUND

I. Field

The present disclosure relates generally to communication, and more specifically to techniques for performing time tracking at a receiver in a communication system.

II. Background

Orthogonal frequency division multiplexing (OFDM) is a multi-carrier modulation technique that can provide good performance for some wireless environments. OFDM partitions the overall system bandwidth into multiple (K) orthogonal frequency subbands, which are also called subcarriers, tones, bins, and so on. With OFDM, each subband is associated with a respective subcarrier that may be modulated with data. Up to K modulation symbols may be sent on the K subbands in each OFDM symbol period.

In an OFDM system, a transmitter typically transforms the modulation symbols for each OFDM symbol period to the time domain with a K-point inverse fast Fourier transform (IFFT) or inverse discrete Fourier transform (IDFT) to obtain K time-domain chips. To combat delay spread in a communication channel, the transmitter repeats some of the K chips to form an OFDM symbol. The repeated portion is commonly called a guard interval or a cyclic prefix. The guard interval is used to combat intersymbol interference (ISI) and inter-carrier interference (ICI) caused by delay spread, which is the time difference between the earliest and latest arriving signal paths at a receiver.

The receiver performs the complementary processing and removes the guard interval in each received OFDM symbol. The receiver then transforms K time-domain samples for each received OFDM symbol to the frequency domain with a K-point fast Fourier transform (FFT) or discrete Fourier transform (DFT) to obtain K received symbols for the K subbands. The receiver then performs detection on the received symbols to recover the transmitted modulation symbols. The receiver typically maintains a time tracking loop that determines the proper placement of an FFT window for each received OFDM symbol. This FFT window indicates which samples should be retained and which samples should be discarded. Data detection performance is greatly affected by the placement of the FFT window.

There is therefore a need in the art for techniques to perform time tracking at a receiver to achieve accurate placement of the FFT window.

SUMMARY

Techniques for performing time tracking at a receiver are described herein. A channel impulse response estimate for a communication channel may be derived, e.g., based on a received pilot. A first arriving path (FAP) and a last arriving path (LAP) may be detected based on the channel impulse response estimate. The FAP and LAP may be correctly detected, and the detected FAP and LAP may be the true FAP and LAP, respectively. However, if the delay spread of the communication channel is excessive, then the FAP and LAP may be incorrectly detected, and the detected FAP and LAP may be swapped and may correspond to the true LAP and FAP, respectively.

To resolve ambiguity in the detected FAP and LAP, two hypotheses may be evaluated. The first hypothesis may correspond to the FAP and LAP being correctly detected, and the second hypothesis may correspond to the FAP and LAP being incorrectly detected. For each hypothesis, hypothesized FAP and LAP are determined based on the detected FAP and LAP, and a correlation window is determined based on the hypothesized FAP and LAP. The correlation window for each hypothesis may cover all or a portion of the guard interval for the hypothesized FAP and/or all or a portion of the guard interval for the hypothesized LAP. For each hypothesis, correlation may be performed between a first segment of received data within the correlation window and a second segment of received data, which may be K samples away, where K is the duration of the useful portion of an OFDM symbol. The correct hypothesis may be determined based on the correlation results for the two hypotheses. The timing at the receiver may be updated based on the hypothesized FAP and LAP for the correct hypothesis. OFDM demodulation may be performed based on the updated receiver timing, e.g., the FFT window may be accurately placed based on the receiver timing.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIGS. 6A-6D show channel topologies and channel impulse responses for two exemplary operating scenarios.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The time tracking techniques described herein may be used for various communication systems such as an OFDM system, an orthogonal frequency division multiple access (OFDMA) system, a single-carrier frequency division multiple access (SC-FDMA) system, and so on. An OFDMA system utilizes OFDM. An SC-FDMA system may utilize interleaved FDMA (IFDMA) to transmit on subbands that are distributed across the system bandwidth, localized FDMA (LFDMA) to transmit on a block of adjacent subbands, or enhanced FDMA (EFDMA) to transmit on multiple blocks of adjacent subbands. In general, modulation symbols are sent in the frequency domain with OFDM and in the time domain with SC-FDMA. An SC-FDMA symbol includes a guard interval that is generated in the same manner as a guard interval for an OFDM symbol. For clarity, the time tracking techniques are specifically described below for an OFDM-based system.

Figure 1:
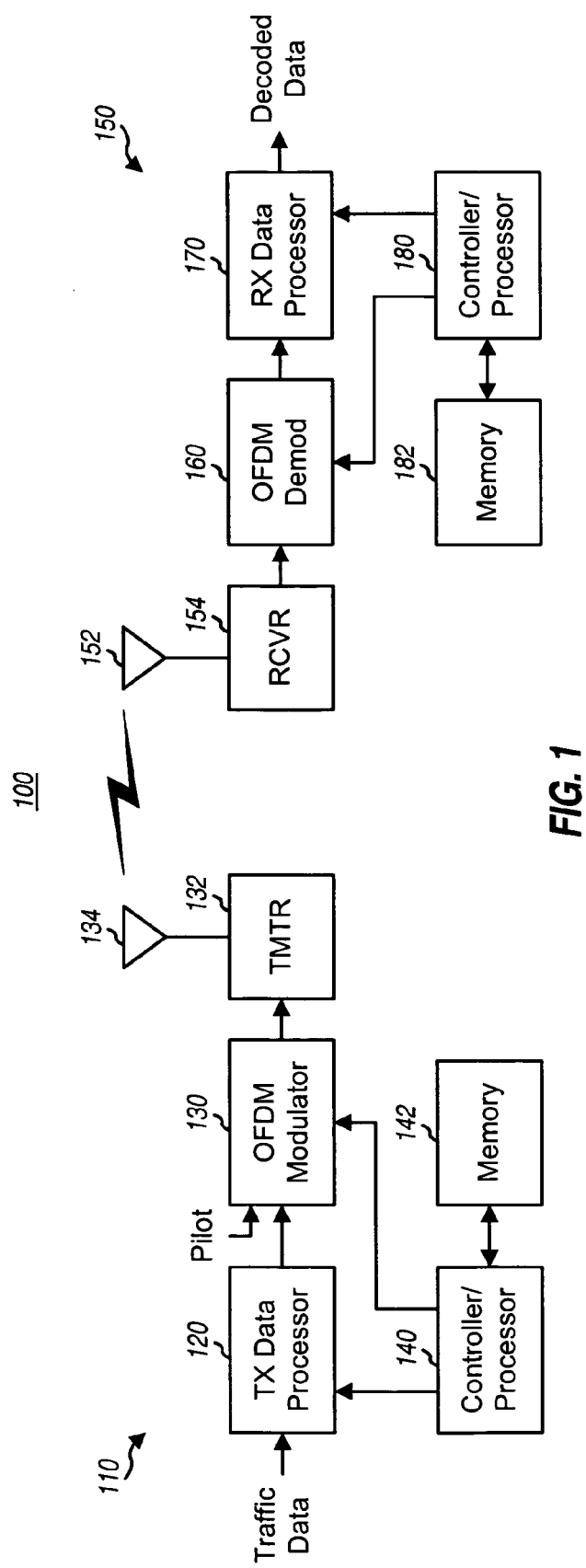
FIG. 1 shows a block diagram of a transmitter and a receiver.

FIG. 1 shows a block diagram of a transmitter 110 and a receiver 150 in an OFDM-based system 100. At transmitter 110, a transmit (TX) data processor 120 processes (e.g., formats, encodes, interleaves, and symbol maps) traffic data and generates data symbols. As used herein, a data symbol is a modulation symbol for traffic data, a pilot symbol is a modulation symbol for pilot, which is data that is known a priori by both the transmitter and receiver, and a zero symbol is a signal value of zero.

An OFDM modulator 130 receives and multiplexes the data symbols and pilot symbols onto data and pilot subbands, respectively, performs OFDM modulation as described below, and provides an OFDM symbol for each OFDM symbol period. An OFDM symbol period is the duration of one OFDM symbol and is also referred to as a symbol period. A transmitter unit (TMTR) 132 receives and processes (e.g., converts to analog, amplifies, filters, and frequency upconverts) the OFDM symbols and generates a modulated signal, which is transmitted via an antenna 134 to receiver 150.

At receiver 150, an antenna 152 receives the modulated signal from transmitter 110 and provides a received signal to a receiver unit (RCVR) 154. Receiver unit 154 conditions (e.g., filters, amplifies, frequency downconverts, and digitizes) the received signal and provides received samples. An OFDM demodulator (Demod) 160 processes the received samples as described below and obtains K received symbols for the K subbands in each OFDM symbol period. The received symbols include received data symbols for the data subbands and received pilot symbols for the pilot subbands. OFDM demodulator 160 performs time tracking to properly place the FFT window for each OFDM symbol period. OFDM demodulator 160 also performs data demodulation/detection on the received data symbols with a channel estimate to obtain data symbol estimates, which are estimates of the data symbols sent by transmitter 110. A receive (RX) data processor 170 then processes (e.g., symbol demaps, deinterleaves, and decodes) the data symbol estimates to obtain decoded data. In general, the processing by OFDM demodulator 160 and RX data processor 170 is complementary to the processing by OFDM modulator 130 and TX data processor 120, respectively, at transmitter 110.

Controllers/processors 140 and 180 control the operation of various processing units at transmitter 110 and receiver 150, respectively. Memories 142 and 182 store data and program codes for transmitter 110 and receiver 150, respectively.

Figure 2:
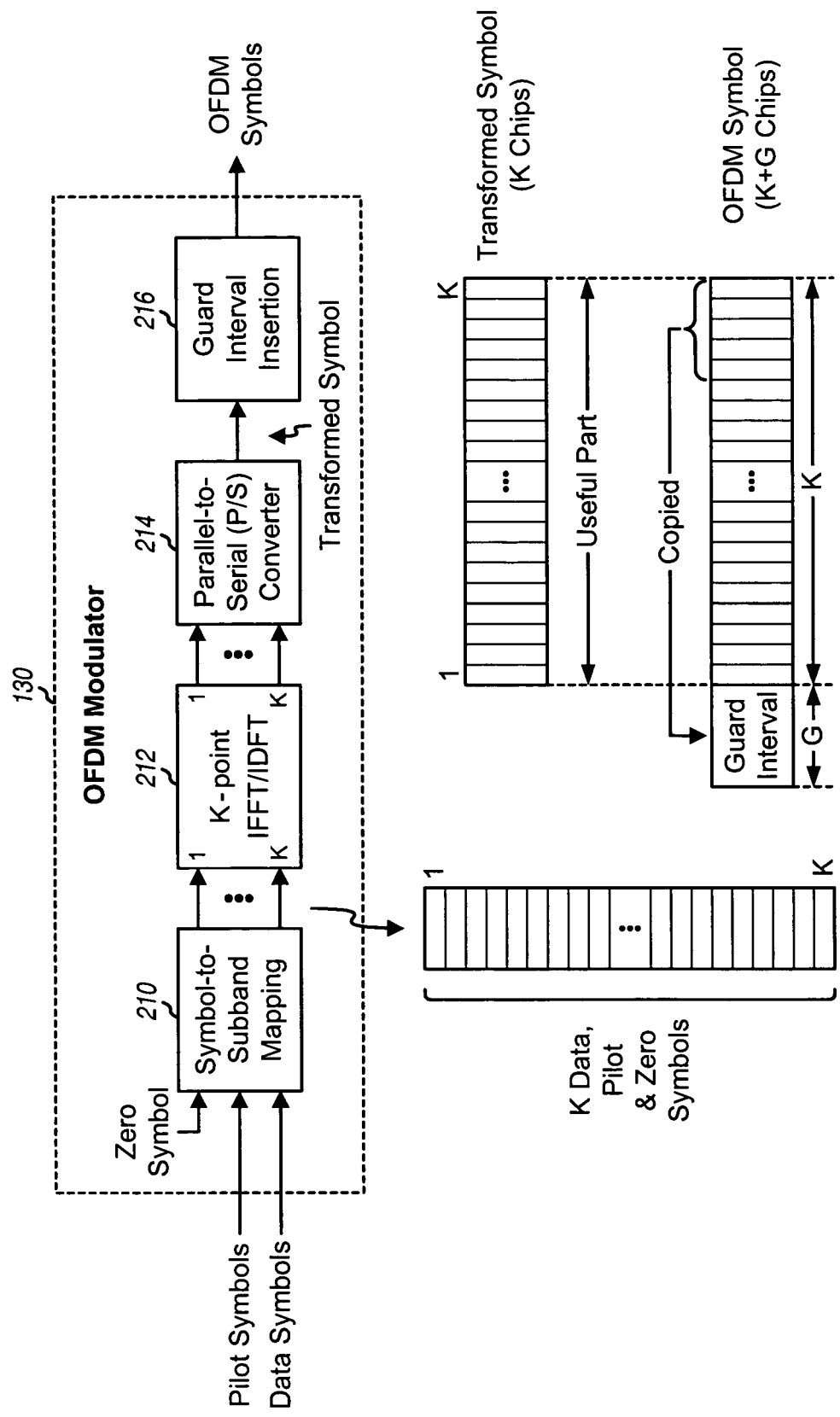
FIG. 2 shows a block diagram of an OFDM modulator at the transmitter.

FIG. 2 shows a block diagram of OFDM modulator 130 at transmitter 110 in FIG. 1. Within OFDM modulator 130, a symbol-to-subband mapping unit 210 receives and maps the data and pilot symbols to subbands used for data and pilot, respectively, maps zero symbols to unused subbands, and provides K transmit symbols for the K total subbands. Each transmit symbol may be a data symbol, a pilot symbol, or a zero symbol in each OFDM symbol period. For each OFDM symbol period, a unit 212 transforms the K transmit symbols to the time domain with a K-point IFFT/IDFT and provides a transformed symbol that contains K time-domain chips. Each chip is a complex value to be transmitted in one chip period. A parallel-to-serial (P/S) converter 214 serializes the K chips for each transformed symbol. A guard interval insertion unit 216 then repeats a portion (or G chips) of each transformed symbol to form an OFDM symbol that contains K+G chips. Each OFDM symbol contains K chips for a useful part and G chips for the guard interval. The guard interval is used to combat ISI and ICI caused by delay spread in the communication channel. The length of the guard interval, G, determines the largest delay spread that the receiver can tolerate without incurring ISI and ICI at a modest moving velocity.

Figure 3:
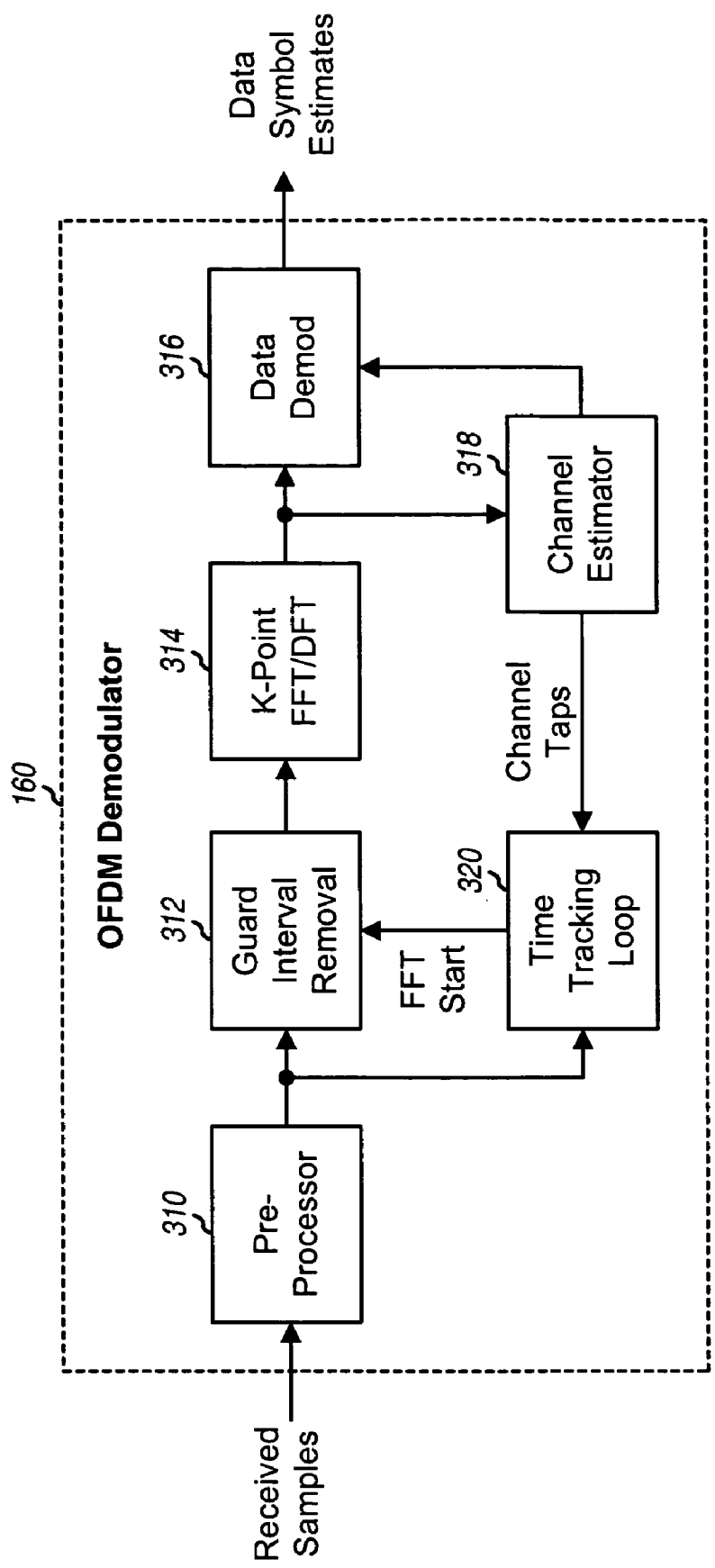
FIG. 3 shows a block diagram of an OFDM demodulator at the receiver.

FIG. 3 shows a block diagram of an embodiment of OFDM demodulator 160 at receiver 150 in FIG. 1. Within OFDM demodulator 160, a pre-processor 310 processes the received samples from receiver unit 154 and provides input samples. Pre-processor 310 may perform automatic gain control (AGC), timing acquisition, filtering, sample rate conversion, direct current (DC) offset removal, frequency error estimation and removal, and/or other functions. A unit 312 removes the guard interval in each received OFDM symbol based on an FFT Start pointer and provides K input samples for that OFDM symbol. The FFT Start pointer controls the placement of the FFT window for each received OFDM symbol.

For each received OFDM symbol, a unit 314 performs a K-point FFT/DFT on the K input samples and provides K frequency-domain received symbols for the K total subbands. A channel estimator 318 derives a channel estimate based on the received pilot symbols. The channel estimate may be a time-domain channel impulse response estimate and/or a frequency-domain channel frequency response estimate. A data demodulator 316 performs data demodulation/detection on the received data symbols with the channel estimate and provides data symbol estimates.

A time tracking loop 320 performs time tracking as described below, determines the timing for each received OFDM symbol, and provides the FFT Start pointer. Although not shown in FIG. 3 for simplicity, OFDM demodulator 160 may include processing units for frame detection, frame synchronization, frequency tracking, and/or other functions.

Channel estimator 318, time tracking loop 320, and other units within OFDM demodulator 160 may perform processing at the sample rate. These units may also decimate the samples and perform processing at a lower rate in order to reduce computational complexity. These units may also oversample the received signal and perform processing at a higher rate in order to achieve better resolution. For clarity, the description below assumes processing at the sample rate, and various quantities, constants, and thresholds are given for sample rate processing.

The receiver may perform time tracking in various manners and based on various types of information sent by the transmitter. For example, the transmitter may transmit a pilot on N subbands that are uniformly distributed across the K total subbands, where 1<N<K. The receiver may receive an OFDM symbol containing the pilot, remove the guard interval, and perform a K-point FFT/DFT on the useful part of the received OFDM symbol to obtain N received pilot symbols for the N pilot subbands. The receiver may then remove the modulation on the N received pilot symbols to obtain N channel gains and may perform an N-point IFFT/IDFT on the N channel gains to obtain a channel impulse response estimate containing N channel taps, which may be denoted as $h_n$ for $n=0, \ldots, N-1$. The receiver may also derive a channel impulse response estimate in other manners known in the art. In an embodiment that is described below, the receiver performs time tracking based on the channel impulse response estimate.

Figure 4:
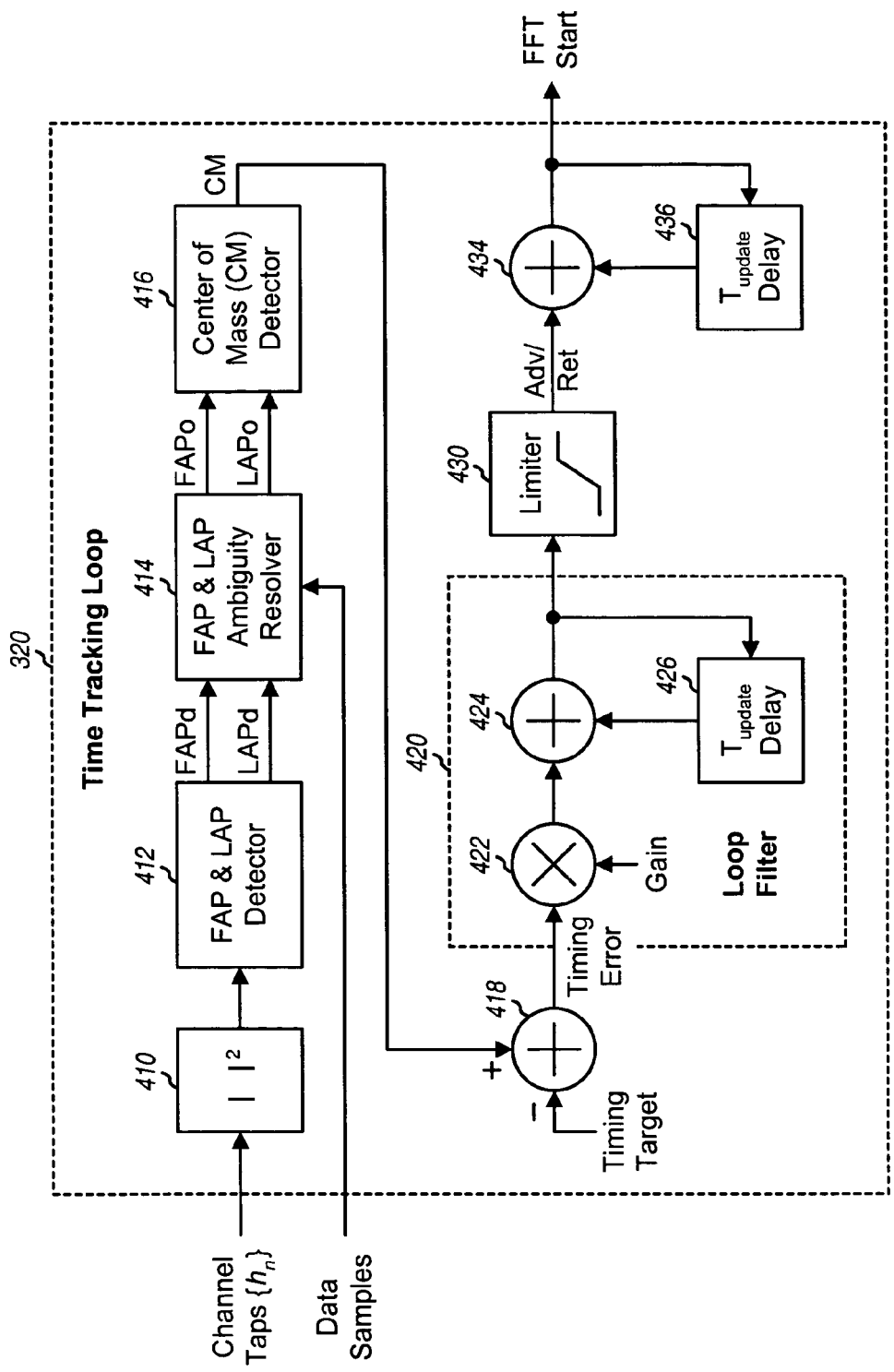
FIG. 4 shows a block diagram of a time tracking loop at the receiver.

FIG. 4 shows a block diagram of an embodiment of time tracking loop 320 in FIG. 3. Within time tracking loop 320, a unit 410 receives the N channel taps for the channel impulse response estimate from channel estimator 318 and computes the square magnitude of each channel tap. Unit 410 may also filter the square magnitudes of the channel taps across multiple symbol periods. Unit 410 provides a channel power profile containing N (filtered or unfiltered) square magnitude values for the N channel taps. A detector 412 detects for the first arriving path (FAP) and the last arriving path (LAP) based on the channel power profile and provides the detected FAP and LAP, as described below. A unit 414 resolves ambiguity in the detected FAP and LAP and provides output FAP and LAP. A center of mass (CM) detector 416 determines the center of mass of the channel power profile based on the output FAP and LAP. A summer 418 subtracts a timing target from the detected center of mass and provides a timing error. The timing target is a target position for the FFT window and may be a programmable value. The timing error is indicative of the error between the detected center of mass and the target position for the FFT window.

A loop filter 420 filters the timing error and provides a timing adjustment. For the embodiment shown in FIG. 4, loop filter 420 implements a first order lowpass filter. A multiplier 422 multiplies the timing error with a gain. A summer 424 sums the output of multiplier 422 with the output of a delay unit 426 and provides the timing adjustment. Delay unit 426 stores the output of summer 424 for the next loop update. Other designs and/or other transfer functions may also be used for loop filter 420. A limiter 430 limits the timing adjustment to within a predetermined range of values and provides an advance/retard (Adv/Ret) output that indicates how much the FFT window should be moved. A summer 434 sums the advance/retard output with the current FFT Start pointer from a delay unit 436 and provides an updated FFT Start pointer. Delay unit 436 stores the updated FFT Start pointer for the next loop update.

Detector 412 may detect for the FAP and LAP in various manners. For clarity, a specific scheme for detecting the FAP and LAP based on the channel power profile is described below. For this scheme, the energy of all channel taps within a sliding window is first computed for different tap positions, as follows:

$$E_k = \sum_{n=k}^{(k+W-1) \bmod N} |h_n|^2, \quad \text{Eq (1)}$$

for
$k = 0, \ldots, N-1,$ where $E_k$ is the energy of the channel taps within the sliding window at tap position k,
W is the width of the sliding window, and
"mod N" denotes a modulo-N operation.

The sliding window width may be selected to be less than or equal to half of the length of the channel impulse response estimate, or $W \leq N/2$. The channel impulse response estimate length is typically less than or equal to the guard interval, or $N \leq G$. This is because the guard interval is typically selected to be greater than the channel delay spread in order to avoid ISI and ICI. Equation (1) essentially moves the sliding window in a circular fashion across the channel power profile and, for each tap position k, computes the energy of the W channel taps within the sliding window. The sliding window wraps around to the front of the channel power profile upon reaching the end of the channel power profile.

A finite difference is then computed for each tap position based on the tap energies, as follows:

$$D_n = \sum_{k=0}^{Q-1} E_{(n+k) \bmod N} - \sum_{k=Q}^{2Q-1} E_{(n+k) \bmod N}, \quad \text{Eq (2)}$$

for
$n = 0, \ldots, N-1,$ where Q is the finite difference order, and
$D_n$ is the finite difference value for tap position n.

A sliding window of length 2Q is used to compute the finite difference. This sliding window is moved in a circular fashion across the channel power profile. For each tap position n, the finite difference $D_n$ is computed as the difference between the combined energies in the first half of the sliding window minus the combined energies in the second half of the sliding window.

Two metrics used to detect for the FAP and LAP may be defined based on the tap energies and the finite difference values, as follows:

$$S_{FAP}(k) = \alpha_1 \cdot E_k + (1-\alpha_1) \cdot D_{(k-Q+1) \bmod N}, \text{ for } k=0, \ldots, N-1, \quad \text{Eq (3)}$$

$$S_{LAP}(k) = -\alpha_2 \cdot E_k + (1-\alpha_2) \cdot D_{(k-Q) \bmod N}, \text{ for } k=0, \ldots, N-1, \quad \text{Eq (4)}$$

where $\alpha_1$ and $\alpha_2$ are coefficients used for FAP and LAP detection, respectively,
$S_{FAP}(k)$ is a metric for FAP detection at tap position k, and
$S_{LAP}(k)$ is a metric for LAP detection at tap position k.

Coefficient $\alpha_1$ determines the sensitivity of the FAP detection and may be selected such that an FAP is detected if it is the last large value before a drop in a zone of near-maximum accumulated energy. Similarly, coefficient $\alpha_2$ determines the sensitivity of the LAP detection and may be selected such that an LAP is detected if it is the first large value before a rise in the zone of near-maximum accumulated energy. Coefficients $\alpha_1$ and $\alpha_2$ may be selected to provide good performance for FAP and LAP detection, respectively, and may be determined based on computer simulation, empirical measurements, and so on.

The location of the FAP may be determined based on $S_{FAP}(k)$, as follows:

$$FAPd = \arg_k\{\max[S_{FAP}(k)]\}, \quad \text{Eq (5)}$$

where FAPd is an index for a detected FAP of sufficient strength. In equation (5), the largest value for $S_{FAP}(k)$ is first identified, and FAPd is set to the index that yields the largest value for $S_{FAP}(k)$.

The location of the LAP may be determined based on $S_{LAP}(k)$, as follows:

$$k_{min} = \arg\min_k\{\min[S_{LAP}(k)]\}, \text{ and} \quad \text{Eq (6)}$$

$$LAPd = (k_{min} + W - 1) \bmod N, \quad \text{Eq (7)}$$

where LAPd is an index for a detected LAP of sufficient strength. In equations (6) and (7), the smallest value for $S_{LAP}(k)$ is first identified, the index that yields the smallest value for $S_{FAP}(k)$ is denoted as $k_{min}$, and LAPd is set to W−1 tap positions to the right of $k_{min}$. The mod N operation in equation (7) constrains LAPd to be within a range of 0 through N−1. In the following description, FAP and LAP denote the true FAP and LAP, respectively, and FAPd and LAPd denote the detected FAP and LAP, respectively.

Figure 5A:
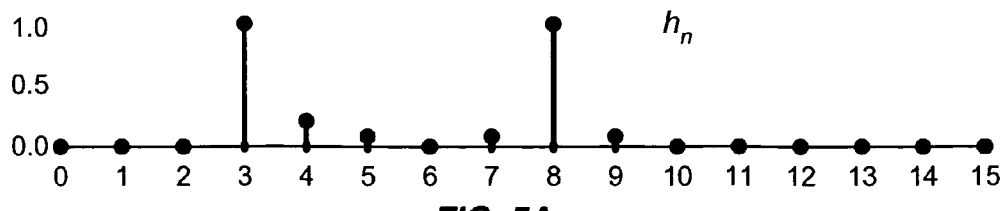
FIGS. 5A-5F illustrate FAP and LAP detection for two exemplary channel impulse response estimates.
Figure 5B:
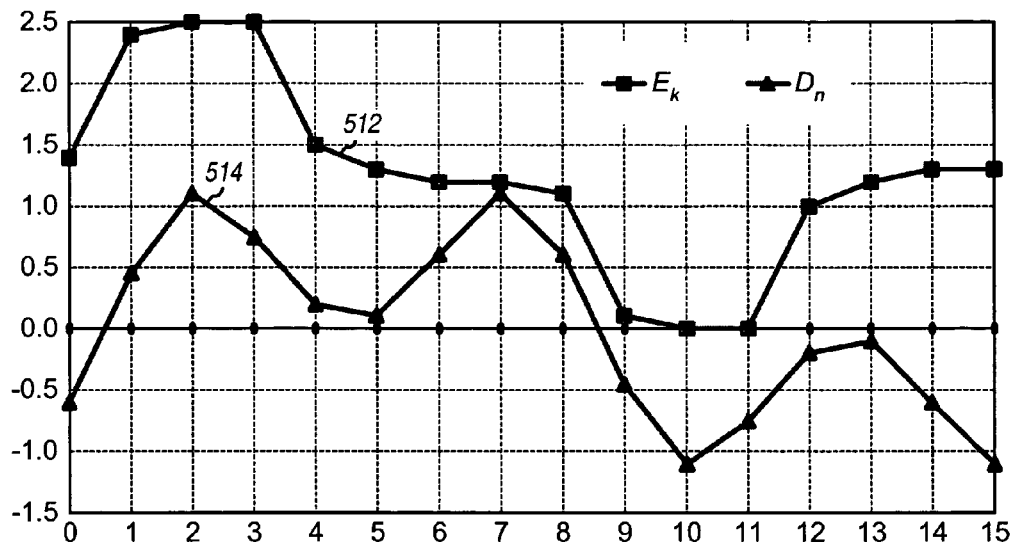
Figure 5C:
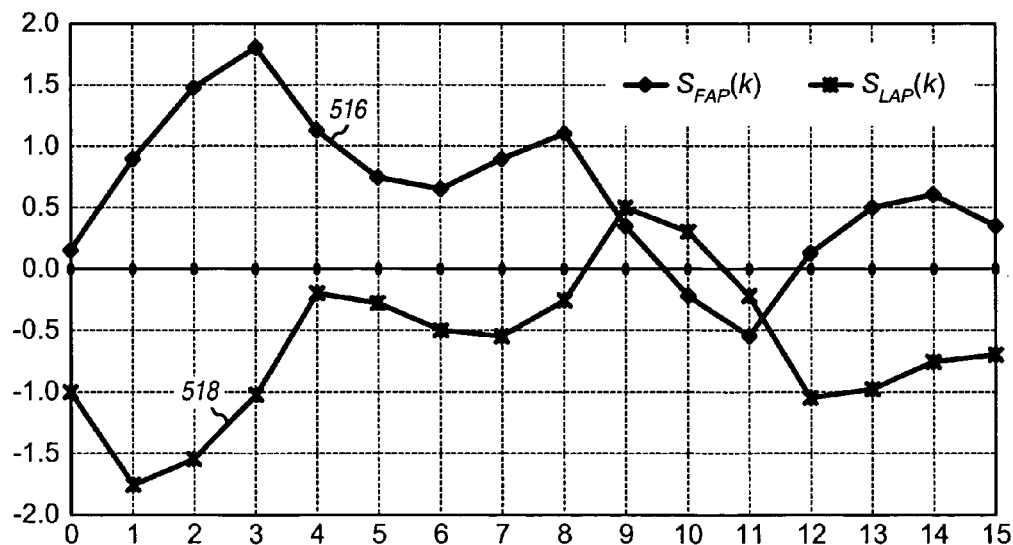

FIGS. 5A through 5C show FAP and LAP detection for an exemplary channel impulse response estimate. For this example, N=16, and the channel impulse response estimate contains two large channel taps at tap positions 3 and 8, as shown in FIG. 5A. FIG. 5B shows a plot 512 of the energy $E_k$ and a plot 514 of the finite difference $D_n$ (with W=8 and Q=2) for the channel impulse response estimate shown in FIG. 5A. FIG. 5C shows a plot 516 of the metric $S_{FAP}(k)$ and a plot 518 of the metric $S_{LAP}(k)$, with $\alpha_1 = \alpha_2 = 0.5$.

As shown in FIG. 5B, the FAP may be ascertained by detecting for a falling edge in plot 512 for the energy $E_k$, which may in turn be ascertained by detecting for a peak in plot 514 for the finite difference $D_n$. The finite difference operation for $D_n$ may enhance noise. Hence, a weighted sum of the finite difference $D_n$ and the energy $E_k$ may be used as the metric $S_{FAP}(k)$. Similarly, the LAP may be ascertained by detecting for a rising edge in plot 512 for the energy $E_k$, which may in turn be ascertained by detecting for a trough in plot 514 for the finite difference $D_n$. A weighted sum of the finite difference $D_n$ and the energy $E_k$ may be used as the metric $S_{LAP}(k)$ in order to mitigate the effects of noise enhancement. For the example shown in FIGS. 5A through 5C, the largest value for $S_{FAP}(k)$ occurs at index k=3, and the FAP is detected to be at FAPd=3. The smallest value for $S_{LAP}(k)$ occurs at index k=1, and the LAP is detected to be at LAPd=1+8−1=8.

Figure 5D:
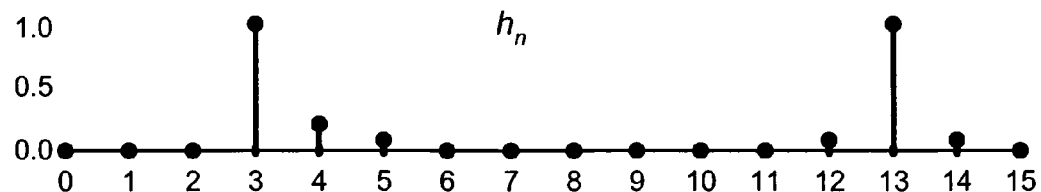
Figure 5E:
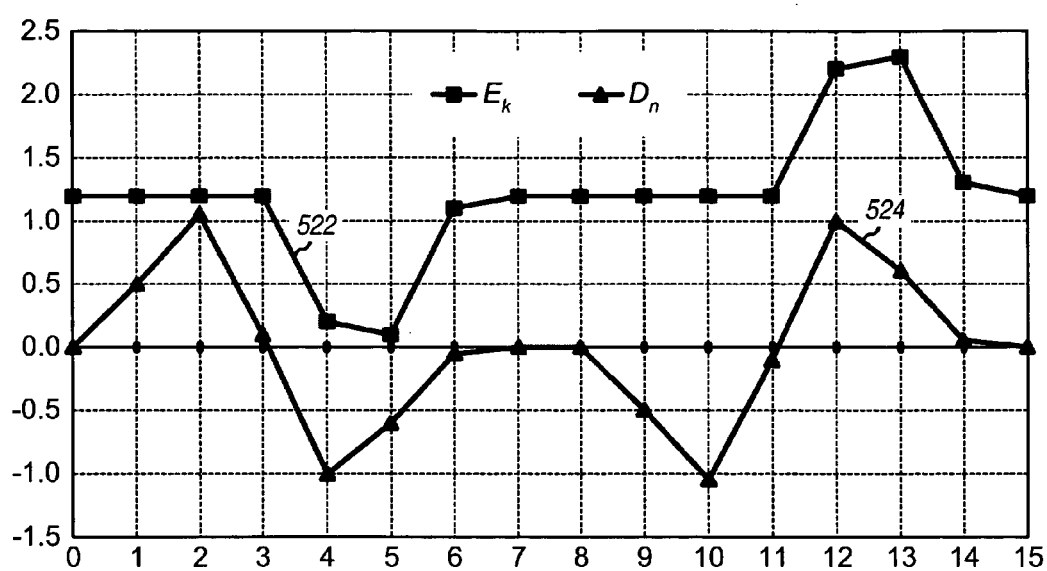
Figure 5F:
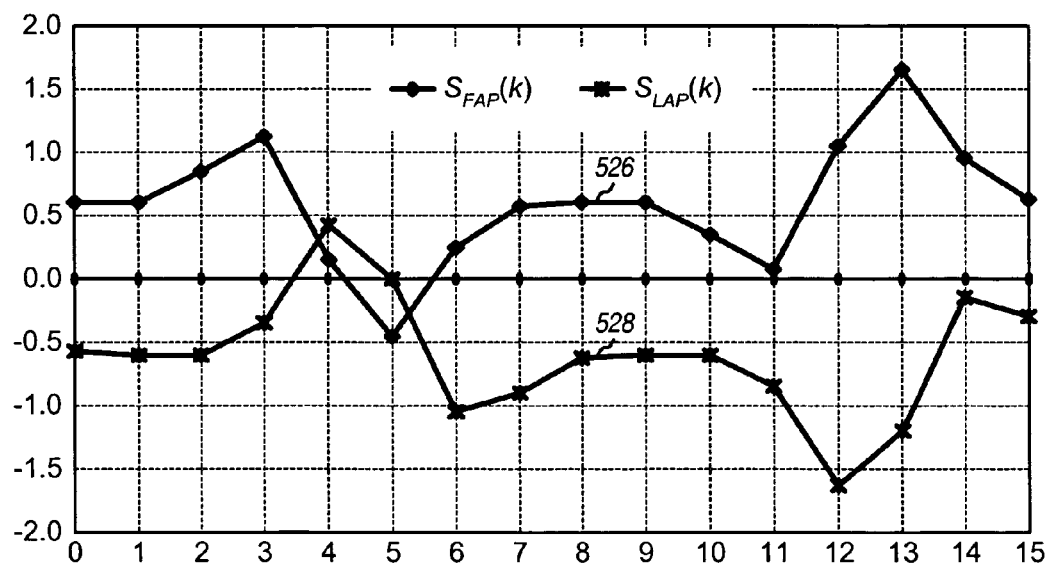

FIGS. 5D through 5F show FAP and LAP detection for another exemplary channel impulse response estimate containing two large channel taps at tap positions 3 and 13. FIG. 5E shows a plot 522 of the energy $E_k$ and a plot 524 of the finite difference $D_n$. FIG. 5F shows a plot 526 of the metric $S_{FAP}(k)$ and a plot 528 of the metric $S_{LAP}(k)$. For the example shown in FIGS. 5D through 5F, the largest value for $S_{FAP}(k)$ occurs at index k=13, and the FAP is detected to be at FAPd=13. The smallest value for $S_{LAP}(k)$ occurs at index k=12, and the LAP is detected to be at LAPd=(12+8−1) mod 16=3.

For clarity, a specific scheme for detecting FAP and LAP has been described above. This scheme may provide erroneous FAP and/or LAP under certain conditions. For example, if the sliding window length is smaller than the channel delay spread, then it may be possible to pick a middle channel path as a likely candidate for either FAP or LAP. Furthermore, depending on the relative positions of the channel paths and/or their relative powers, this detection scheme with W=N/2 may detect different candidates for FAP and LAP. The erroneous detection of FAP and LAP may be avoided, e.g., by assuming that the previous center of mass was correctly located around a predetermined point $D_{mid}$. Then, for the current channel estimate, an initial decision may be made as to which signal path appears later than $D_{mid}$ and which signal path comes before $D_{mid}$ but is aliased into the channel estimate earlier. Assuming that the channel content is equally likely to appear early as well as late, a cut-off point between past and future may be set to $D_{mid}+N/2$, and any channel tap after this cut-off point is assumed to have arrived earlier but is aliased. Note that the channel content may have previously been present only up until $D_{mid}+\max\{\Delta_h\}/2$, where $\Delta_h$ is the channel delay spread. The region between $D_{mid}+\max\{\Delta_h\}/2$ and $D_{mid}+N/2$ represents a search zone for late channel content. In general, FAP and LAP detection may be performed in various manners and to account for various channel conditions.

The FAP and LAP detection scheme described above in equations (1) through (7) provides relatively accurate detected FAP and LAP when the channel delay spread $\Delta_h$ is less than or equal to half of the guard interval, or $\Delta_h \leq G/2$. However, when the delay spread is longer than half of the guard interval, the decisions may be swapped so that LAPd=FAP and FAPd=LAP. Hence, the detected FAP may or may not be the true FAP, and the detected LAP may or may not be the true LAP. The accuracy of the FAPd and LAPd decisions is dependent on the actual channel taps, the channel delay spread, and possibly other factors. Hence, it is desirable to achieve accurate detection of FAP and LAP.

The FAP and LAP may also be detected in other manners. Regardless of the scheme used for FAP and LAP detection, there may be ambiguity as to whether the detected FAP and LAP are correct or swapped.

The ambiguity in the FAP and LAP detection may be resolved by exploiting the relationship between the start of the FFT window (which is indicated by the FFT Start pointer) and the resulting channel delay profile. In particular, the locations of the FAP and LAP in the channel impulse response estimate are dependent on (1) the propagation delays for the FAP and LAP and (2) the placement of the FFT window. This relationship is illustrated by two examples below.

FIG. 6A shows an exemplary transmission of an OFDM symbol via a communication channel with multiple signal paths. In general, each signal path may have any complex gain and any propagation delay, both of which are determined by the channel environment. For simplicity, the gains for the FAP and LAP are assumed to be equal in this example. The delay spread of the communication channel is $\Delta_h$, which is the difference between the propagation delays for the FAP and LAP.

The OFDM symbol includes a useful part and a guard interval. The receiver obtains a copy of the OFDM symbol via each signal path. Each OFDM symbol copy is scaled by the complex gain for the associated signal path and is further delayed by the propagation delay for that signal path. For simplicity, FIG. 6A shows only the first OFDM symbol copy received via the FAP and the last OFDM symbol copy received via the LAP. The start of the last OFDM symbol copy is delayed by $\Delta_h$ samples from the start of the first OFDM symbol copy. The received OFDM symbol is a superposition of all of the OFDM symbol copies at the receiver.

FIG. 6A also shows the placement of the FFT window for the OFDM symbol. The start of the FFT window is indicated by the FFT Start pointer. The FFT window has a width of K samples and determines which samples are selected for subsequent processing. For the example shown in FIG. 6A, the start of the FFT window is $\Delta$ samples away from the first sample in the useful part of the OFDM symbol copy for the FAP and is $\Delta+\Delta_h$ samples away from the first sample in the useful part of the OFDM symbol copy for the LAP.

FIG. 6A also shows an ISI/ICI-free region, which is an overlapping region for the guard intervals for all OFDM symbol copies at the receiver. If the FFT Start pointer is within the ISI/ICI-free region, then the proper K samples are selected for processing, and ISI and ICI are not encountered, which is desirable. The goal of time tracking loop 320 is to maintain the FFT Start pointer within the ISI/ICI-free region.

FIG. 6B shows a channel impulse response estimate for the exemplary transmission shown in FIG. 6A. The channel impulse response for the communication channel includes a channel tap for each signal path. For simplicity, FIG. 6B shows only two channel taps at indices of $\Delta$ and $\Delta+\Delta_h$ for the FAP and LAP, respectively. The magnitude of each channel tap is determined by the complex gain for the associated signal path. The location or index of each channel tap is determined by the propagation delay for the associated signal path and the FFT Start pointer.

FIG. 6B essentially shows a channel delay profile for the communication channel. For this channel delay profile, the FFT Start pointer is mapped to the origin. The channel gain for each signal path is mapped to an index determined by the distance between the FFT Start pointer and the first sample in the useful part of the OFDM symbol copy for that signal path. The channel delay profile includes information that indicates the start of the channel impulse response estimate.

FIG. 6C shows another exemplary transmission of an OFDM symbol via a communication channel with multiple signal paths having a delay spread of $G-\Delta_h$. For the example shown in FIG. 6C, the start of the FFT window is $\Delta+\Delta_h$ samples away from the first sample in the useful part of the OFDM symbol copy for the FAP and is $\Delta+G$ samples away from the first sample for the useful part of the OFDM symbol copy for the LAP.

FIG. 6D shows a channel impulse response estimate for the exemplary transmission shown in FIG. 6C. This channel impulse response estimate includes two channel taps at indices of $\Delta$ and $\Delta+\Delta_h$ corresponding to the LAP and FAP, respectively. In this example, the first sample in the useful part of the OFDM symbol copy for the LAP is more than G from the start of the FFT window. This results in the channel tap for the LAP wrapping around and appearing at index $\Delta$, which is to the left of the channel tap for the FAP.

As shown in FIGS. 6A through 6D, the channel delay profile (e.g., in FIG. 6B or 6D) may be determined based on the channel topology (e.g., in FIG. 6A or 6C) and the FFT Start pointer. Conversely, the channel topology may be determined based on the channel delay profile and the FFT Start pointer.

FIGS. 6A through 6D assume that the FFT Start pointer is not in the useful portion of an OFDM symbol. A given channel topology may also be associated with multiple possible FFT Start pointer locations. For example, the channel topology in FIG. 6D may also be obtained with the start of the FFT window being at $\Delta$ samples to the right away of the start of the useful portion of the OFDM symbol copy for the FAP, i.e., G samples to the right of the FFT Start pointer location shown in FIG. 6D. The uncertainty in the FFT Start pointer may also be tested to determine the correct FAP and LAP.

Time tracking loop 320 attempts to maintain the FFT Start pointer within the ISI/ICI-free region. Time tracking loop 320 attempts to achieve this goal in the presence of timing drift due to difference between the clock frequencies at the transmitter and receiver, variations in the clock frequencies over time, changes in the communication channel, and so on. Accurate updating of the FFT Start pointer is essential to achieve good data detection performance.

Figure 7A:
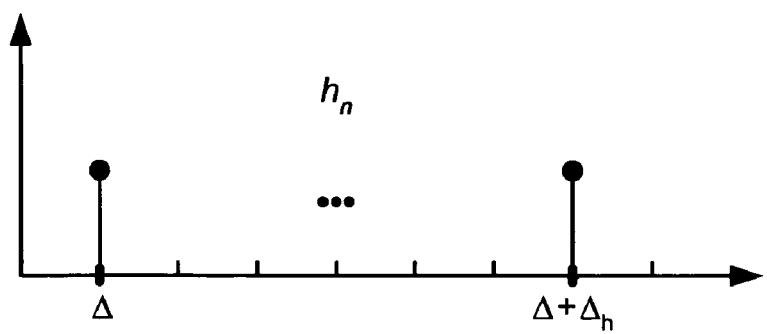
FIGS. 7A-7C show possible decisions by an FAP & LAP detector.

FIG. 7A shows an exemplary channel impulse response estimate at the receiver. The receiver has knowledge of the channel tap at each tap position but, prior to time tracking, does not know where the channel impulse response actually starts. FAP & LAP detector 412 within time tracking loop 320 detects for the FAP and LAP.

Figure 7B:
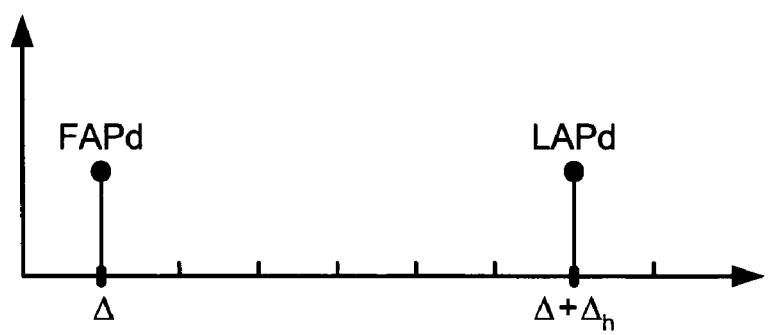
Figure 7C:
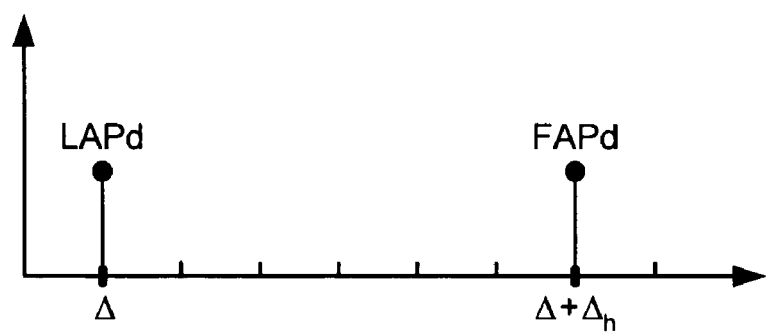

FIGS. 7B and 7C show two possible outcomes of the FAP and LAP detection for the channel impulse response estimate shown in FIG. 7A. The channel delay profile for the outcome in FIG. 7B indicates that the detected FAP is at index $\Delta$ and the detected LAP is at index $\Delta+\Delta_h$. The channel delay profile for the outcome in FIG. 7C indicates that the detected LAP is at index $\Delta$ and the detected FAP is at index $\Delta+\Delta_h$.

Based on the channel impulse response estimate shown in FIG. 7A, FAP & LAP detector 412 provides the detected FAP and LAP, which may be as shown in FIG. 7B or 7C, depending on whether the delay spread Ah exceeds the limit of the time tracking algorithm, the magnitude and location of the channel taps, and possibly other factors. If the actual channel delay profile is as shown in FIG. 7B and the FAPd and LAPd decisions are correct, then the channel topology shown in FIG. 6A may be reconstructed based on the relationship between the channel topology, the FFT Start pointer, and the channel delay profile. However, if the actual channel delay profile is as shown in FIG. 7B and the FAPd and LAPd decisions are incorrect, then the incorrect channel topology shown in FIG. 6C may be reconstructed.

The FFT Start pointer is updated in different manners for the channel topologies shown in FIGS. 6A and 6C. Hence, incorrect detection of the FAP and LAP results in erroneous interpretation of the channel topology, which then results in the FFT Start pointer being updated in a suboptimal or wrong manner, which may in turn degrade performance for both time tracking and data detection.

To resolve ambiguity in the FAP and LAP detection, the receiver may evaluate two hypotheses for the FAPd and LAPd decisions to determine whether these decisions are correct or incorrect. Hypothesis 0 may denote a hypothesis that the FAPd and LAPd decisions are correct, and hypothesis 1 may denote a hypothesis that the FAPd and LAPd decisions are incorrect. For each hypothesis, the receiver may reconstruct the channel topology for that hypothesis by exploiting the OFDM symbol structure and using the relationship between the FFT Start pointer and the channel delay profile, as described above for FIGS. 6A through 6D. From the reconstructed channel topology, the receiver can ascertain where the guard interval and guard copy are located based on the OFDM symbol structure. The receiver may then evaluate each hypothesis and perform correlation between the guard interval and guard copy. The correct hypothesis will yield a larger correlation result and may be used to correct erroneous FAPd and LAPd decisions.

Figure 8A:
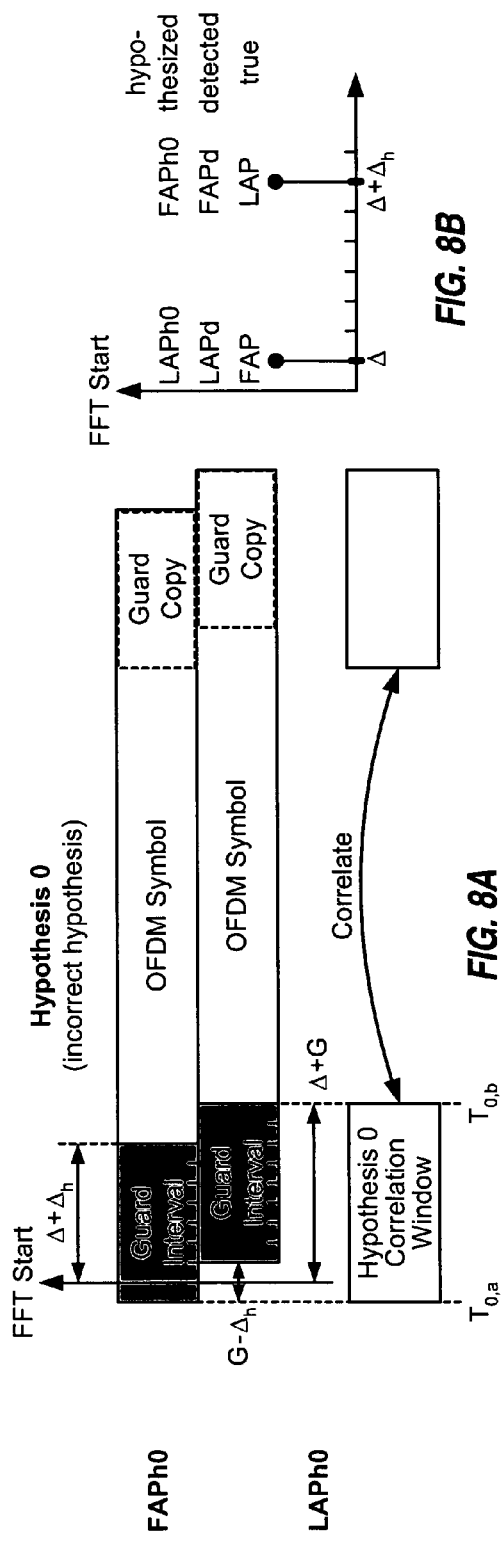
FIGS. 8A-8D illustrate an embodiment for resolving ambiguity in the FAP and LAP detection by correlating OFDM symbol data.
Figure 8B:
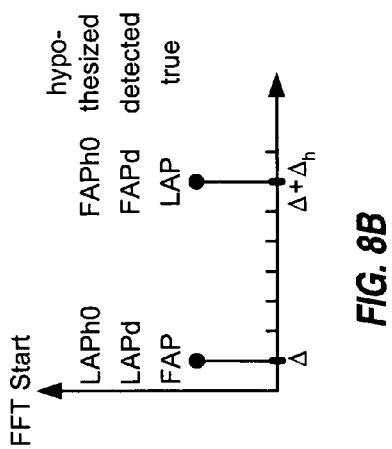

FIGS. 8A through 8D show an embodiment for resolving ambiguity in the FAP and LAP detection by correlating OFDM symbol data. For this example, the true FAP and LAP and the detected FAP and LAP are assumed to be as shown in FIG. 8B, and the detected FAP and LAP are incorrect. In the following description, FAPh and LAPh denote the hypothesized FAP and LAP, respectively, for a particular hypothesis.

For hypothesis 0, the hypothesized FAP and LAP are equal to the detected FAP and LAP, respectively, or FAPh0=FAPd and LAPh0=LAPd, as shown in FIG. 8B. The channel topology shown in FIG. 8A is reconstructed based on the hypothesized FAP and LAP and the FFT Start pointer. For the embodiment shown in FIGS. 8A through 8D, a correlation window covers the first sample in the guard interval of the OFDM symbol copy for the FAP through the last sample in the guard interval of the OFDM symbol copy for the LAP. For hypothesis 0, the correlation window starts at sample index $T_{0,a}$ and ends at sample index $T_{0,b}$.

Figure 8C:
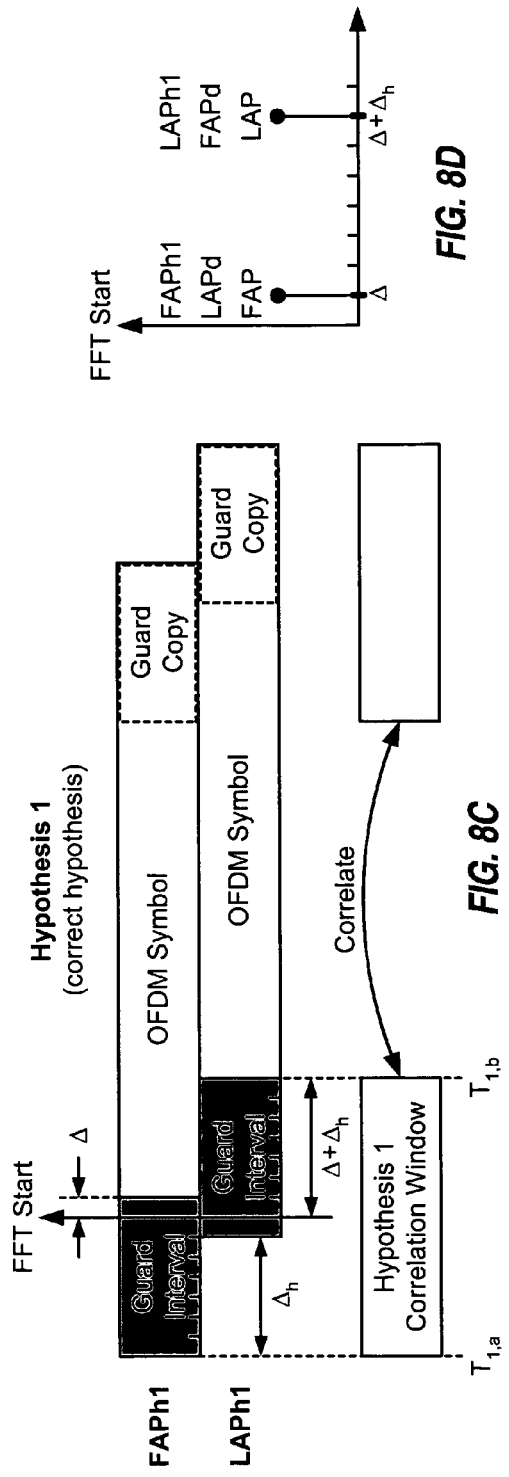
Figure 8D:
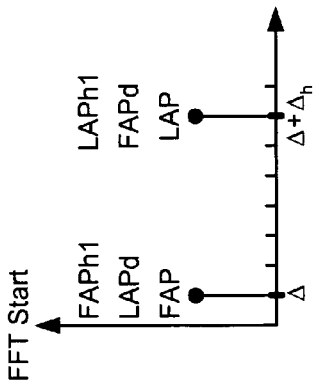

For hypothesis 1, the hypothesized FAP and LAP are equal to the detected LAP and FAP, respectively, or FAPh0=LAPd and LAPh0=FAPd, as shown in FIG. 8D. The channel topology shown in FIG. 8C is reconstructed based on the hypothesized FAP and LAP shown in FIG. 8D and the FFT Start pointer. For hypothesis 1, the correlation window starts at sample index $T_{1,a}$ and ends at sample index $T_{1,b}$.

For each hypothesis i, the start of the correlation window, $T_{i,a}$, may be determined as:

$$T_{i,a} = FFT\ \text{Start} + T_{FAP,i} - G, \text{ for } i=0, 1, \qquad \text{Eq (8)}$$

where $T_{FAP,i}$ is the tap location for FAPhi. $T_{FAP,0} = \Delta + \Delta_h$ for hypothesis 0 shown in FIGS. 8A and 8B, and $T_{FAP,1} = \Delta$ for hypothesis 1 shown in FIGS. 8C and 8D.

For each hypothesis i, the end of the correlation window, $T_{i,b}$, may be determined as:

$$T_{i,b} = FFT\ \text{Start} + T_{LAP,i}, \text{ for } i=0, 1, \qquad \text{Eq (9)}$$

where $T_{LAP,i}$ is the tap location for LAPhi after accounting for any wrap-around effect. $T_{LAP,0} = \Delta + G$ for hypothesis 0 shown in FIGS. 8A and 8B, where G is added to account for LAPh0 appearing to the left of FAPh0 due to wrap-around effect. $T_{LAP,1} = \Delta + \Delta_h$ for hypothesis 1 shown in FIGS. 8C and 8D, where G is not added because LAPh1 appears to the right of FAPh1 and there is no wrap-around effect.

The size of the correlation window for each hypothesis i may be computed as $T_{i,b} - T_{i,a}$. As shown in FIGS. 8A and 8C, the correlation windows for hypotheses 0 and 1 typically have different sizes.

A correlation is performed between the guard interval and the guard copy for each hypothesis i, as follows:

$$C_i = \frac{1}{T_{i,b} - T_{i,a}} \cdot \left| \sum_{n=T_{i,a}}^{T_{i,b}} r_n \cdot r^*_{n+K} \right|, \qquad \text{Eq (10)}$$

for $i = 0, 1,$ where $r_n$ is an input sample at sample index n for the received OFDM symbol, $C_i$ is the correlation result for hypothesis i, and "*" denotes a complex conjugate.

FIGS. 8A and 8C show the guard interval as well as the guard copy for each OFDM symbol copy. The guard interval is shown by gray shading, and the guard copy is shown with a dashed box. For each OFDM symbol copy, the guard interval is a duplicate of the guard copy. As shown in equation (10), each sample in the guard interval is multiplied with the complex conjugate of a corresponding sample in the guard copy, and the multiplication results are accumulated across the length of the correlation window. The division by $(T_{i,b} - T_{i,a})$ in equation (10) accounts for different correlation window sizes being used for hypotheses 0 and 1 and results in a normalized correlation result.

If the hypothesized FAP and LAP are the true FAP and LAP, as shown in FIG. 8D, then the correlation window covers the guard interval and the guard copy of the transmitted OFDM symbol, as shown in FIG. 8C. The channel topology for the true hypothesis then results in a higher correlation result between the guard interval and the guard copy because these sections carry the same waveform from the transmitter.

If the hypothesized FAP and LAP are not the true FAP and LAP, as shown in FIG. 8B, then the correlation window covers a portion of the actual guard interval and also a portion of the useful part of the transmitted OFDM symbol. The channel topology for the false hypothesis then results in a lower correlation result between the "guard interval" and "guard copy", which contain random data that are often statistically independent. The correlation results for the two hypotheses may thus be used to determine which hypothesis is correct and to correct any erroneous FAPd and LAPd decisions that result from using only the channel impulse response estimate.

Figure 9:
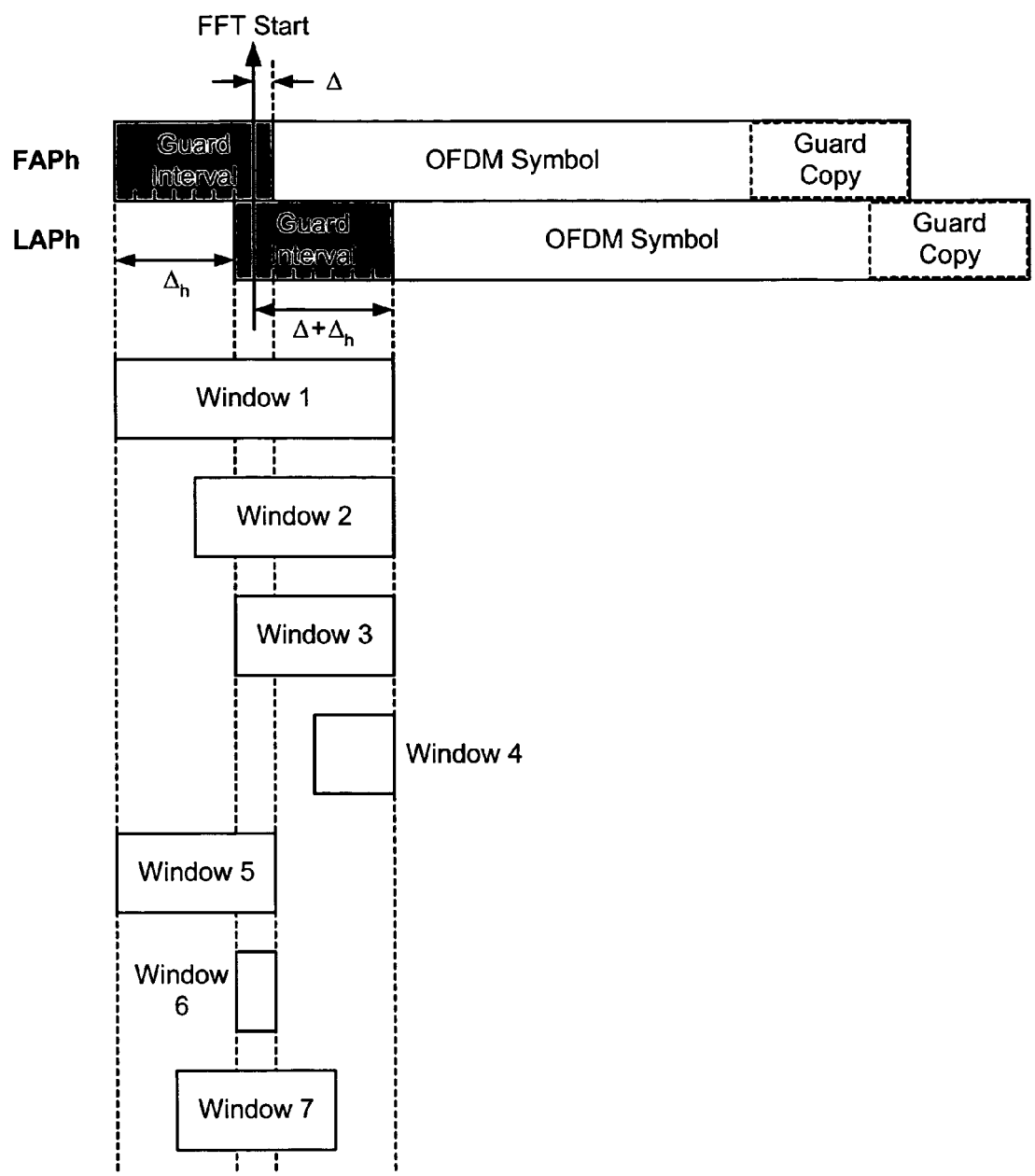
FIG. 9 shows correlation windows used to resolve FAP and LAP ambiguity.

The correct hypothesis may be determined as follows:

if $C_0 \geq C_1$, then FAPo=FAPd and LAPo=LAPd, else  Eq (11a)

if $C_1 > C_0$, then FAPo=LAPd and LAPo=FAPd,  Eq (11b)

where FAPo and LAPo are the output FAP and LAP provided by unit 414 in FIG. 4. Equation (11a) is for the case in which hypothesis 0 is correct and the detected FAP and LAP are provided directly as the output FAP and LAP, respectively. Equation (11b) is for the case in which hypothesis 1 is correct and the detected FAP and LAP are swapped and provided as the output FAP and LAP FIG. 9 shows various embodiments of the correlation window. For the embodiment shown in FIGS. 8A through 8D, which is labeled as Window 1 in FIG. 9, the correlation window starts at the first sample of the guard interval for the hypothesized FAP and ends at the last sample of the guard interval for the hypothesized LAP. For the embodiment labeled as Window 2, the correlation window starts at the middle sample of the guard interval for the hypothesized FAP and ends at the last sample of the guard interval for the hypothesized LAP. For the embodiment labeled as Window 3, the correlation window covers the entire guard interval for the hypothesized LAP. For the embodiment labeled as Window 4, the correlation window covers a portion (e.g., the second half) of the guard interval for the hypothesized LAP. For the embodiment labeled as Window 5, the correlation window covers the entire guard interval for the hypothesized FAP. For the embodiment labeled as Window 6, the correlation window covers the ISI/ICI region for the hypothesized FAP and LAP. For the embodiment labeled as Window 7, the correlation window has a fixed size (e.g., G samples) and is centered at the middle of the ISI/ICI region for the hypothesized FAP and LAP. Various other correlation windows may also be used. In another embodiment that is not shown in FIG. 9, the correlation window size may be selected as $W \geq \max\{\Delta_h\}$. In this embodiment, the previous FAP/LAP locations may be used to limit the correlation window size.

Figure 10:
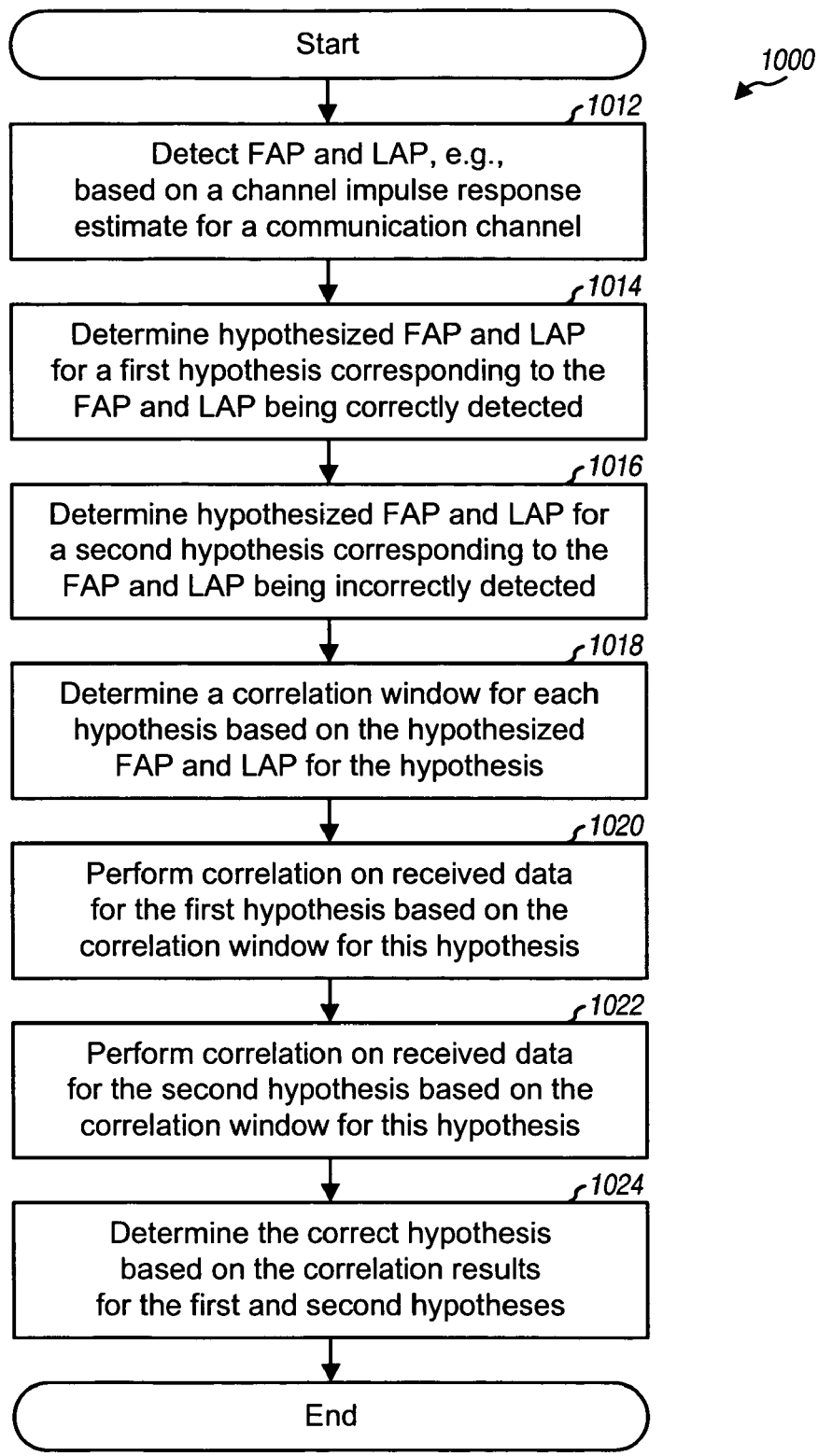
FIG. 10 shows a process for resolving ambiguity in detected FAP and LAP.

FIG. 10 shows an embodiment of a process 1000 for resolving ambiguity in the detected FAP and LAP. The FAP and LAP are initially detected, e.g., based on a channel impulse response estimate for a communication channel (block 1012). The FAP and LAP may be detected, e.g., by determining the energies of channel taps within a sliding window for different tap positions, determining finite difference values based on the energies, detecting the FAP based on a first function of the energies and the finite difference values, and detecting the LAP based on a second function of the energies and the finite difference values, as described above for equations (1) through (7).

Hypothesized FAP and LAP for a first hypothesis corresponding to the FAP and LAP being correctly detected are determined based on the detected FAP and LAP (block 1014). Hypothesized FAP and LAP for a second hypothesis corresponding to the FAP and LAP being incorrectly detected are also determined based on the detected FAP and LAP (block 1016). A correlation window is determined for each hypothesis based on the hypothesized FAP and LAP for that hypothesis (block 1018). The correlation window for each hypothesis may cover all or a portion of the guard interval for the hypothesized FAP and/or all or a portion of the guard interval for the hypothesized LAP.

Correlation is then performed on received data for the first hypothesis based on the correlation window for the first hypothesis (block 1020). Correlation is also performed on the received data for the second hypothesis based on the correlation window for the second hypothesis (block 1022). For each hypothesis, the correlation may be performed between a first segment of received data within the correlation window for that hypothesis and a second segment of received data that is K samples away, where K is the duration of the useful portion of an OFDM symbol. The correct hypothesis is then determined based on the correlation results for the first and second hypotheses (block 1024).

In another aspect, the correct FAP and LAP are determined by evaluating a single hypothesis. The FAP and LAP may be initially detected as described above. A single hypothesis for the FAP and LAP may be selected for evaluation in various manners.

In an embodiment, a hypothesis that results in a smaller timing adjustment to the current FFT Start pointer is selected for evaluation. In this embodiment, the amount of timing adjustment to the current FFT Start pointer for hypothesis 0 is determined and denoted as $\Delta T_0$. The amount of timing adjustment to the current FFT Start pointer for hypothesis 1 is also determined and denoted as $\Delta T_1$. The hypothesis with the smaller timing adjustment is selected for evaluation and is called hypothesis s. Correlation is performed for the selected hypothesis s as described above. The correlation result $C_s$ for hypothesis s may be compared against a threshold $C_{th}$. If $C_s$ is greater than $C_{th}$, then hypothesis s is deemed to be the correct hypothesis, and the FFT Start pointer may be updated based on the hypothesized FAP and LAP for hypothesis s. Otherwise, if $C_s$ is equal to or less than $C_{th}$, then the other hypothesis that was not evaluated (which is called hypothesis u) is deemed to be the correct hypothesis, and the FFT Start pointer may be updated based on the hypothesized FAP and LAP for hypothesis u.

In another embodiment, a hypothesis is selected for evaluation based on timing (e.g., timing adjustments) for prior hypothesis decisions. In this embodiment, timing adjustments may be computed for hypotheses 0 and 1 as described above. The timing adjustments for the two hypotheses may be compared against timing adjustments for the correct hypotheses for prior update intervals. For example, timing adjustments for P most recent correct hypotheses may be stored, and the hypothesis 0 or 1 that is closer to more of the P stored hypotheses may be selected for evaluation. As another example, the hypothesis 0 or 1 that is closer to the average timing of the P stored hypotheses may be selected. Other types of history information may also be stored and used for hypothesis selection. In any case, the selected hypothesis may be evaluated, and the correlation result $C_s$ may be compared against the threshold $C_{th}$ to determine whether the selected hypothesis s or the unselected hypothesis u is the correct hypothesis.

A single hypothesis may be selected for evaluation based on the detected FAP and LAP and history information, as described above. The single hypothesis may also be selected without history information. For example, hypothesis 0 may always be selected, or one hypothesis may be randomly selected. The selected hypothesis may be evaluated and compared against the threshold $C_{th}$. The threshold $C_{th}$ may be a fixed value that may be selected to achieve good performance. The threshold $C_{th}$ may also be a configurable that may be set, e.g., based on the correlation results for the recent correct hypotheses. The correlation window for the selected hypothesis may be determined based on any of the embodiments described above for FIG. 9. A variable size correlation window may improve detection performance. However, a fixed size correlation window may reduce implementation complexity.

Figures 11, 12:
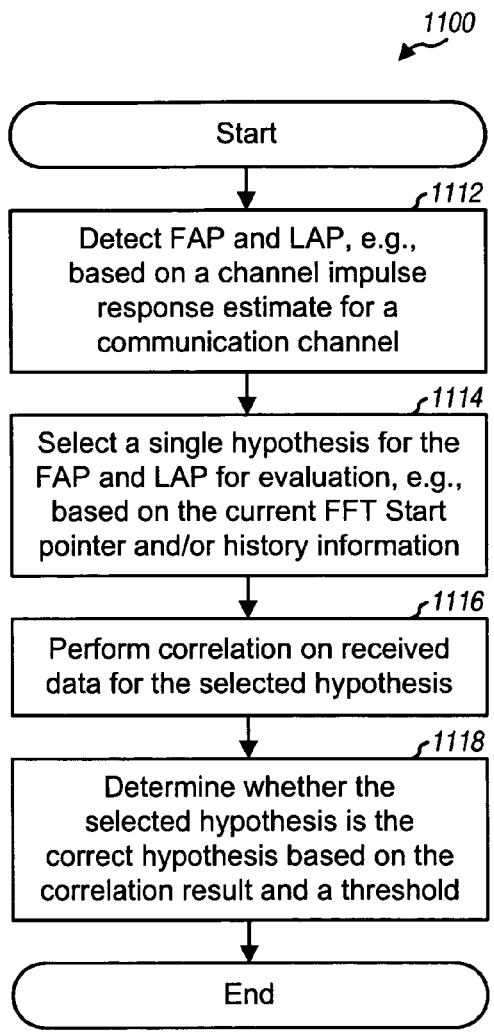
FIG. 11 shows another process for resolving ambiguity in the detected FAP and LAP.
FIG. 12 shows a process for performing time tracking at the receiver.

FIG. 11 shows an embodiment of a process 1100 for resolving ambiguity in the detected FAP and LAP. The FAP and LAP are initially detected, e.g., based on a channel impulse response estimate for a communication channel (block 1112). A single hypothesis for the FAP and LAP is selected for evaluation (block 1114). The hypothesis may be selected based on the current FFT Start pointer, history information for prior hypotheses, and so on. Correlation is then performed on received data for the selected hypothesis (block 1116). Whether the selected hypothesis is the correct hypothesis is determined based on the correlation result and a threshold (block 1118).

The techniques described herein may be used to resolve ambiguity in the FAP and LAP detection when the channel delay spread is more than half of the guard interval (or $\Delta_h > G/2$) as well as when the channel delay spread is less than or equal to half of the guard interval. In general, the techniques may be used to resolve ambiguity in any two channel taps for an impulse response of a communication channel, where the ambiguity is due to uncertainty as to whether the first channel tap is earlier or later than the second channel tap. Correlation may be performed for a first hypothesis corresponding to the first channel tap being earlier than the second channel tap. Correlation may also be performed for a second hypothesis corresponding to the first channel tap being later than the second channel tap. The correlation results for the two hypotheses may be used to determine whether the first channel tap is earlier or later than the second channel tap.

Referring back to FIG. 4, center of mass detector 416 receives the output FAP and LAP from unit 414 and determines the center of mass of the channel impulse response estimate. In an embodiment, detector 416 determines the center of mass based solely on the output FAP and LAP. For example, the center of mass may be set equal to the midpoint between FAPo and LAPo, as follows:

$$DS = (LAPo - FAPo) \mod N, \text{ and} \quad \text{Eq (12a)}$$

$$CM = (FAPo + DS/2) \mod N, \quad \text{Eq (12b)}$$

where DS is the detected channel delay spread. In equation (12a), the channel delay spread is computed as $\{(LAPo-FAPO) \mod N\}$, where the mod N operation accounts for the case in which LAPo is to the left of FAPo in the channel delay profile. In equation (12b), the center of mass is half of the channel delay spread from FAPo, where the mod N operation accounts for possible wrap-around of the center of mass. In another embodiment, the center of mass is determined based on more than two (e.g., all) channel taps in the channel impulse response estimate, channel taps with sufficient strength, and so on. The center of mass computation may be performed in other manners known in the art.

The timing error from summer 418 may be computed as follows:

$$\text{Timing Error} = CM - \text{Timing Target.} \quad \text{Eq (13)}$$

The timing error is a signed value that may be positive, zero, or negative.

In an embodiment, the timing adjustment from loop filter 420 may be computed as follows:

Timing Adjustment(*t*)=Timing Error×Gain+Timing Adjustment(*t*−1). Eq (14)

In another embodiment, the timing adjustment may be computed as follows:

Timing Adjustment(*t*)=Timing Error×Gain1+Timing Adjustment(*t*−1)×Gain2. Eq (15)

Gain in equation (14) and Gain1 and Gain2 in equation (15) may be fixed or programmable values.

The timing adjustment may be limited to within a predetermined range of values, as follows:

Adv/Ret(*t*)=*SAT*{Timing Adjustment(*t*),Max Adjust}, Eq (16)

where Max Adjust is an absolute value for the maximum timing adjustment for any given update and SAT { } is a saturation operation. The resulting Adv/Ret (t) is a saturated signed value.

The FFT Start pointer may be updated as follows:

FFT Start pointer(*t*)=FFT Start pointer(*t*−1)+Adv/Ret (*t*). Eq (17)

The FFT Start pointer is advanced by K+G sample periods for each OFDM symbol and is further updated by Adv/Ret (t) in each loop update interval.

Time tracking loop 320 attempts to maintain the center of mass at a specific location in the channel delay profile, which is referred to as the target timing. A good location for the target timing may be dependent on the actual channel impulse response, the length of the channel estimation window (N), the length of the guard interval (G), and so on. A programmable value may be used for the target timing. The loop filter gain, Max Adjust, and/or other parameters may be fixed or configurable values.

FIG. 12 shows an embodiment of a process 1200 for performing time tracking at the receiver. The FAP and LAP are initially detected, e.g., based on a channel impulse response estimate for a communication channel (block 1212). Ambiguity in the detected FAP and LAP is then resolved by performing correlation on received data for at least one hypothesis for the FAP and LAP (block 1214). Two hypotheses may be evaluated as described in FIG. 10 or a single hypothesis may be evaluated as described in FIG. 11. The timing at the receiver is then updated based on the hypothesized FAP and LAP for the correct hypothesis (block 1216). For block 1216, the center of mass of the channel impulse response estimate may be determined based on (e.g., as the midpoint between) the hypothesized FAP and LAP for the correct hypothesis. A timing error may be determined based on the center of mass and a timing target and may be filtered to obtain a timing adjustment. The timing adjustment may be limited to within a predetermined range of values and may be used to update the receiver timing, e.g., the FFT Start pointer. OFDM demodulation is performed on the received data based on the updated receiver timing (block 1218). The FFT Start pointer may be used to select samples in the received data for processing.

The techniques described herein may be implemented by various means. For example, these techniques may be implemented in hardware, firmware, software, or a combination thereof. For a hardware implementation, the processing units used to resolve ambiguity in a channel estimate and/or to perform time tracking at a receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The software codes may be stored in a memory (e.g., memory 182 in FIG. 1) and executed by a processor (e.g., processor 180). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to detect for a first arriving path (FAP) and a last arriving path (LAP) in a communication channel, to perform correlation on received data for a first hypothesis corresponding to the FAP and LAP being correctly detected, to perform correlation on the received data for a second hypothesis corresponding to the FAP and LAP being incorrectly detected, and to determine a correct hypothesis among the first and second hypotheses based on correlation results for the first and second hypotheses; and
a memory coupled to the at least one processor; wherein the received data includes at least two data segments, wherein the two data segments carry copies of the same data, and wherein the correlation is between a first segment of data within a correlation window and a second segment of data expected to contain at least one copy of the same data, the second segment of data separated from the first segment of data by symbol data;
wherein the at least one processor is configured to determine hypothesized FAP and LAP for each hypothesis based on the detected FAP and LAP.

2. The apparatus of claim 1, wherein the at least one processor is configured to determine a first correlation window for the first hypothesis and a second correlation window for the second hypothesis based on the detected FAP and LAP.

3. The apparatus of claim 2, wherein the at least one processor is configured to perform correlation between a first segment of received data within the first correlation window and a second segment of received data, and to perform correlation between a third segment of received data within the second correlation window and a fourth segment of received data.

4. The apparatus of claim 3, wherein the first and second segments are separated by K samples and the third and fourth segments are separated by K samples, where K is a duration of a useful portion of an OFDM symbol.

5. The apparatus of claim 1, wherein the at least one processor is configured to determine a correlation window for each hypothesis to cover guard intervals for the hypothesized FAP and LAP for the hypothesis.

6. The apparatus of claim 1, wherein the at least one processor is configured to determine a correlation window for each hypothesis to cover at least a portion of a guard interval for the hypothesized FAP and at least a portion of a guard interval for the hypothesized LAP.

7. The apparatus of claim 1, wherein the at least one processor is configured to determine a correlation window for each hypothesis to cover at least a portion of a guard interval for the hypothesized FAP.

8. The apparatus of claim 1, wherein the at least one processor is configured to determine a correlation window for each hypothesis to cover at least a portion of a guard interval for the hypothesized LAP.

9. The apparatus of claim 1, wherein the at least one processor is configured to detect for the FAP and LAP based on a channel impulse response estimate for the communication channel.

10. The apparatus of claim 9, wherein the channel impulse response estimate comprises multiple channel taps, and wherein the at least one processor is configured to determine energies of channel taps within a sliding window for different tap positions, to determine a finite difference based on the energies for different tap positions, to detect for the FAP based on a first function of the energies and the finite difference, and to detect for the LAP based on a second function of the energies and the finite difference.

11. The apparatus of claim 1, wherein the at least one processor is configured to determine a center of mass of an impulse response for the communication channel based on the hypothesized FAP and LAP for the correct hypothesis, to update a pointer based on the center of mass, and to use the pointer to select samples in the received data for processing.

12. The apparatus of claim 11, wherein the at least one processor is configured to determine the center of mass as a midpoint between the hypothesized FAP and LAP for the correct hypothesis.

13. The apparatus of claim 11, wherein the at least one processor is configured to determine a timing error based on the center of mass and a timing target, to filter the timing error to obtain a timing adjustment, and to update the pointer based on the timing adjustment.

14. The apparatus of claim 13, wherein the at least one processor is configured to limit the timing adjustment to within a predetermined range of values.

15. The apparatus of claim 1, wherein the at least one processor is configured to update timing based on the correct hypothesis, and to perform orthogonal frequency division multiplexing (OFDM) demodulation on the received data based on the updated timing.

16. A method comprising:
detecting for a first arriving path (FAP) and a last arriving path (LAP) in a communication channel;
performing correlation on received data for a first hypothesis corresponding to the FAP and LAP being correctly detected;
performing correlation on the received data for a second hypothesis corresponding to the FAP and LAP being incorrectly detected; and
determining a correct hypothesis among the first and second hypotheses based on correlation results for the first and second hypotheses; wherein the received data includes at least two data segments, wherein the two data segments carry copies of the same data, and wherein the correlation is between a first segment of data within a correlation window and a second segment of data expected to contain at least one copy of the same data, the second segment of data separated from the first segment of data by symbol data samples;
wherein performing correlation on the received data comprises determining hypothesized FAP and LAP for each hypothesis based on the detected FAP and LAP.

17. The method of claim 16, wherein the detecting for the FAP and LAP comprises detecting for the FAP and LAP based on a channel impulse response estimate for the communication channel.

18. The method of claim 16, wherein the performing correlation on the received data comprises
determining a first correlation window for the first hypothesis and a second correlation window for the second hypothesis based on the detected FAP and LAP,
performing correlation between a first segment of received data within the first correlation window and a second segment of received data, and
performing correlation between a third segment of received data within the second correlation window and a fourth segment of received data.

19. The method of claim 16, wherein the performing correlation on the received data further comprises
determining a correlation window for each hypothesis to cover a portion of a guard interval for the hypothesized FAP, a portion of a guard interval for the hypothesized LAP, or both, and
performing correlation for each hypothesis based on the correlation window for the hypothesis.

20. The method of claim 16, further comprising:
updating timing based on the correct hypothesis; and
performing orthogonal frequency division multiplexing (OFDM) demodulation on the received data based on the updated timing.

21. An apparatus comprising:
means for detecting for a first arriving path (FAP) and a last arriving path (LAP) in a communication channel;
means for performing correlation on received data for a first hypothesis corresponding to the FAP and LAP being correctly detected;
means for performing correlation on the received data for a second hypothesis corresponding to the FAP and LAP being incorrectly detected; and
means for determining a correct hypothesis among the first and second hypotheses based on correlation results for the first and second hypotheses; wherein the received data includes at least two data segments, wherein the two data segments carry copies of the same data, and wherein the correlation is between a first segment of data within a correlation window and a second segment of data expected to contain at least one copy of the same data, the second segment of data separated from the first segment of data by symbol data samples;
wherein the means for performing correlation on the received data comprise means for determining hypothesized FAP and LAP for each hypothesis based on the detected FAP and LAP.

22. The apparatus of claim 21, wherein the means for performing correlation on the received data comprises
means for determining a first correlation window for the first hypothesis and a second correlation window for the second hypothesis based on the detected FAP and LAP,
means for performing correlation between a first segment of received data within the first correlation window and a second segment of received data, and
means for performing correlation between a third segment of received data within the second correlation window and a fourth segment of received data.

23. The apparatus of claim 21, wherein the means for performing correlation on the received data further comprises means for determining a correlation window for each hypothesis to cover a portion of a guard interval for the hypothesized FAP, a portion of a guard interval for the hypothesized LAP, or both, and means for performing correlation for each hypothesis based on the correlation window for the hypothesis.

24. The apparatus of claim 21, further comprising:

means for updating timing based on the correct hypothesis; and means for performing orthogonal frequency division multiplexing (OFDM) demodulation on the received data based on the updated timing.

25. A processor readable media for storing instructions operable to:

detect for a first arriving path (FAP) and a last arriving path (LAP) in a communication channel;

perform correlation on received data for a first hypothesis corresponding to the FAP and LAP being correctly detected;

perform correlation on the received data for a second hypothesis corresponding to the FAP and LAP being incorrectly detected;

determine a correct hypothesis among the first and second hypotheses based on correlation results for the first and second hypotheses; wherein the received data includes at least two data segments, wherein the two data segments carry copies of the same data, and wherein the correlation is between a first segment of data within a correlation window and a second segment of data expected to contain at least one copy of the same data, the second segment of data separated from the first segment of data by symbol data; and determine a first correlation window for the first hypothesis and a second correlation window for the second hypothesis based on the detected FAP and LAP.

26. The processor readable media of claim 25, and further for storing instructions operable to detect for the FAP and LAP based on a channel impulse response estimate for the communication channel.

27. The processor readable media of claim 25, and further for storing instructions operable to determine a first correlation window for the first hypothesis and a second correlation window for the second hypothesis based on the detected FAP and LAP, perform correlation between a first segment of received data within the first correlation window and a second segment of received data, and perform correlation between a third segment of received data within the second correlation window and a fourth segment of received data.

28. The processor readable media of claim 25, and further for storing instructions operable to determine a correlation window for each hypothesis to cover a portion of a guard interval for the hypothesized FAP, a portion of a guard interval for the hypothesized LAP, or both, and perform correlation for each hypothesis based on the correlation window for the hypothesis.

29. The processor readable media of claim 25, and further for storing instructions operable to update timing based on the correct hypothesis; and direct orthogonal frequency division multiplexing (OFDM) demodulation on the received data based on the updated timing.

30. An apparatus comprising:

at least one processor configured to determine first and second channel taps for an impulse response of a communication channel, to perform correlation on received data for a first hypothesis corresponding to the first channel tap being earlier than the second channel tap, to perform correlation on the received data for a second hypothesis corresponding to the first channel tap being later than the second channel tap, and to determine whether the first channel tap is earlier or later than the second channel tap based on correlation results for the first and second hypotheses; and a memory coupled to the at least one processor; wherein the received data includes at least two data segments, wherein the two data segments carry copies of the same data, and wherein the correlation is between a first segment of data within a correlation window and a second segment of data expected to contain at least one copy of the same data, the second segment of data separated from the first segment of data by symbol data samples;

wherein for each hypothesis the at least one processor is configured to determine a correlation window for the hypothesis to cover a portion of a guard interval for the first channel tap, a portion of a guard interval for the second channel tap, or both, and to perform correlation for the hypothesis based on the correlation window.

31. The apparatus of claim 30, wherein the at least one processor is configured to update timing based on the correct hypothesis and to perform demodulation on the received data based on the updated timing.

32. An apparatus comprising:

at least one processor configured to detect for a first arriving path (FAP) and a last arriving path (LAP) in a communication channel to select a hypothesis for the FAP and LAP for evaluation, to perform correlation on the received data for the selected hypothesis corresponding to the FAP and LAP, and to determine whether the selected hypothesis is a correct hypothesis based on correlation result for the selected hypothesis; and a memory coupled to the at least one processor; wherein the received data includes at least two data segments, wherein the two data segments carry copies of the same data, and wherein the correlation is between a first segment of data within a correlation window and a second segment of data expected to contain at least one copy of the same data, the second segment of data separated from the first segment of data by symbol data samples;

wherein the at least one processor is configured to determine hypothesized FAP and LAP for each hypothesis based on the detected FAP and LAP.

33. The apparatus of claim 32, wherein the at least one processor is configured to select the hypothesis based on history information for hypotheses previously evaluated.

34. The apparatus of claim 32, wherein the at least one processor is configured to select a hypothesis associated with timing that is closest to timing of hypotheses previously evaluated.

35. The apparatus of claim 32, wherein the at least one processor is configured to determine whether the selected hypothesis is the correct hypothesis based on the correlation result and a threshold.

36. An apparatus comprising:

means for detecting for a first arriving path (FAP) and a last arriving path (LAP) in a communication channel;

means for selecting a hypothesis for the FAP and LAP for evaluation;

means for performing correlation on the received data for the selected hypothesis corresponding to the FAP and LAP; and means for determining whether the selected hypothesis is a correct hypothesis based on correlation result for the selected hypothesis; wherein the received data includes at least two data segments, wherein the two data segments carry copies of the same data, and wherein the correlation is between a first segment of data within a correlation window and a second segment of data expected to contain at least one copy of the same data, the second segment of data separated from the first segment of data by symbol data samples;

wherein the means for performing correlation on the received data comprise means for determining hypothesized FAP and LAP for each hypothesis based on the detected FAP and LAP.

37. The apparatus of claim 36, wherein the means for selecting the hypothesis comprises means for selecting the hypothesis based on history information for hypotheses previously evaluated.

38. The apparatus of claim 36, wherein the means for determining whether the selected hypothesis is the correct hypothesis comprises means for determining whether the selected hypothesis is the correct hypothesis based on the correlation result and a threshold.

* * * * *